United States Patent [19]

Shinkai et al.

[11] Patent Number: 5,679,430
[45] Date of Patent: Oct. 21, 1997

[54] OPTICAL RECORDING MEDIUM

[75] Inventors: Masahiro Shinkai, Chiba; Sumiko Kitagawa, Saitama; Takahiko Suzuki, Chiba; Kenryo Namba, Tokyo, all of Japan

[73] Assignee: TDK Corporation, Tokyo, Japan

[21] Appl. No.: 665,283

[22] Filed: Jun. 17, 1996

[30] Foreign Application Priority Data

| Jun. 19, 1995 | [JP] | Japan | 7-175523 |
| May 30, 1996 | [JP] | Japan | 8-158841 |
| Jun. 6, 1996 | [JP] | Japan | 8-166885 |

[51] Int. Cl.⁶ .................................................. B32B 3/00
[52] U.S. Cl. ............... 428/64.1; 428/64.4; 428/64.8; 428/913; 430/270.14; 430/495.1; 430/945; 369/283; 369/288
[58] Field of Search .......................... 428/64.1, 64.2, 428/64.4, 64.8, 913; 430/270.14, 495.1, 945; 369/283, 288

[56] References Cited

U.S. PATENT DOCUMENTS

| 5,486,437 | 1/1996 | Iwamura et al. | 369/288 |
| 5,536,548 | 7/1996 | Koji et al. | 428/64.1 |
| 5,547,727 | 8/1996 | Suttleworth et al. | 428/64.1 |

FOREIGN PATENT DOCUMENTS

| 640161 | 2/1994 | Japan . |
| 640162 | 2/1994 | Japan . |
| 752544 | 2/1995 | Japan . |

*Primary Examiner*—Elizabeth Evans
*Attorney, Agent, or Firm*—Watson Cole Stevens Davis, P.L.L.C.

[57] ABSTRACT

A recording layer contains a dye A having a complex index of refraction at 780 nm whose real part n is 1.8–2.8 and imaginary part k is up to 0.15 and forming a thin film exhibiting an absorption spectrum whose half-value width is up to 170 nm and a dye B having a complex index of refraction at 630 nm or 650 nm whose real part n is 1.8–2.8 and imaginary part k is up to 0.2. An optical recording medium capable of writing and reading in a conventional wavelength region of about 780 nm and a shorter wavelength region of about 630 to 680 nm is obtained.

16 Claims, 2 Drawing Sheets

OPTICAL RECORDING MEDIUM

BACKGROUND OF THE INVENTION

1. Field of the Invention

This invention relates to an optical recording medium having a dye film as a recording layer, and more particularly, to a write-once type optical recording disc capable of writing and reading at a short wavelength (of about 630 nm to about 680 nm) as well as a conventional wavelength of about 780 nm.

2. Prior Art

In recent years, optical recording discs of the write-once, rewritable and other types have been of great interest as high capacity information carrying media. Among the optical recording discs, there are known those having a dye film composed mainly of a dye as the recording layer. Structurally classified, optical recording discs proposed thus far include widely used discs of the air-sandwich structure having an air space on a recording layer made of a dye film and discs of the close contact type having a reflective layer in close contact with a recording layer made of a dye film which can be read in accordance with the compact disc (CD) standard. (See Nikkei Electronics, Jan. 23, 1989, No. 465, page 107; the Functional Dye Department of the Kinki Chemical Society, Mar. 3, 1989, Osaka Science & Technology Center; and Proceedings SPIE—The International Society for Optical Engineering, Vol. 1078, pages 80–87, "Optical Data Storage Topical Meeting", 17–19, January 1989, Los Angels.)

Recording layers for these discs are Generally formed by using a dye coating solution and coating it.

To meet the recent increasing demand for higher density recording, attempts have been made to reduce the wavelength of laser light. For example, Japanese Patent Application Kokai (JP-A) Nos. 40161/1994 and 40162/1994 disclose optical recording media which utilize cyanine dyes for recording with a short wavelength laser.

As the research for writing and reading with a short wavelength laser steps forward, it becomes desirable to read the information which has been recorded at a conventional laser wavelength of about 780 nm by means of a reading equipment utilizing a short wavelength laser of about 630 nm to about 680 nm and vice versa. There arises a requirement to render writing/reading at the conventionally used wavelength interchangeable with writing/reading at a short wavelength.

The proposals of JP-A 40161/1994 and 40162/1994 can accommodate for short wavelength operation although writing/reading at the conventional wavelength of about 780 nm is impossible.

Also, JP-A 52544/1996 discloses an optical recording medium using a phthalocyanine dye of a specific structure. Allegedly writing/reading at a short wavelength becomes possible by employing an air-sandwich structure and writing/reading at a wavelength of about 780 nm becomes possible by employing a structure having a reflecting layer in close contact.

The proposal of JP-A 52544/1996 requires to change the structure of a medium itself, but does not meet the demand to carry out writing/reading on the same medium at different wavelengths, a short wavelength and a long wavelength.

PROBLEM TO BE SOLVED BY THE INVENTION

An object of the present invention is to provide an optical recording medium which is stable, can accommodate the Orange Book standard, and enables writing and reading at a short wavelength (of about 630 nm to about 680 nm).

MEANS FOR SOLVING THE PROBLEM

This and other objects are achieved by the present invention which is defined below as (1) to (16).

(1) An optical recording medium comprising a recording layer and a reflecting layer on a substrate, wherein said recording layer comprises a dye A having a complex index of refraction at 780 nm whose real part n is 1.8 to 2.8 and imaginary part k is up to 0.15 and forming a thin film having an absorption spectrum whose half-value width is up to 170 nm and a dye B having a complex index of refraction at 630 nm or 650 nm whose real part n is 1.8 to 2.8 and imaginary part k is up to 0.2.

(2) The optical recording medium of (1) wherein said dye A is a phthalocyanine dye of the following formula (I):

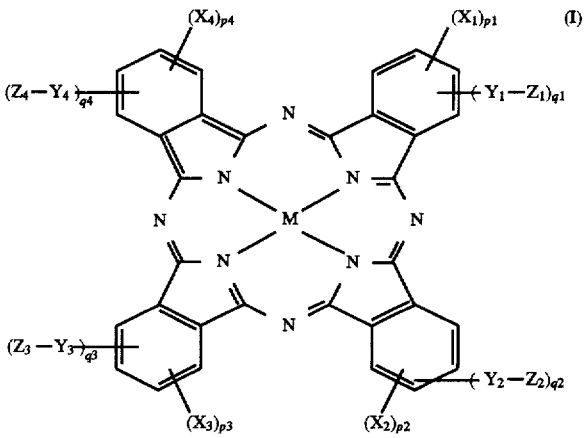

wherein M is a center atom, each of $X_1$, $X_2$, $X_3$, and $X_4$ which may be the same or different is a halogen atom, p1, p2, p3, and p4 each are 0 or an integer of 1 to 4, the sum of p1+p2+p3+p4 is 0 to 15, each of $Y_1$, $Y_2$, $Y_3$, and $Y_4$ which may be the same or different is an oxygen or sulfur atom, each of $Z_1$, $Z_2$, $Z_3$, and $Z_4$ which may be the same or different is selected from the group consisting of an alkyl radical, alicyclic hydrocarbon radical, aromatic hydrocarbon radical, and heterocyclic radical each having at least 4 carbon atoms, and q1, q2, q3, and q4 each are 0 or an integer of 1 to 4 and are not equal to 0 at the same time, the sum of q1+q2+q3+q4 is 1 to 8.

(3) The optical recording medium of (2) wherein the position at which each of $Y_1$, $Y_2$, $Y_3$, and $Y_4$ is attached to the phthalocyanine ring is the 3- and/or 6-position.

(4) The optical recording medium of (2) wherein each of $Z_1$, $Z_2$, $Z_3$, and $Z_4$ is an alicyclic hydrocarbon radical or aromatic hydrocarbon radical.

(5) The optical recording medium of (4) wherein the alicyclic hydrocarbon radical or aromatic hydrocarbon radical represented by each of $Z_1$, $Z_2$, $Z_3$, and $Z_4$ has a substituent at a position adjacent to its position of attachment to a corresponding one of $Y_1$, $Y_2$, $Y_3$, and $Y_4$.

(6) The optical recording medium of (1) wherein said dye B is a trimethinecyanine dye of the following formula (II):

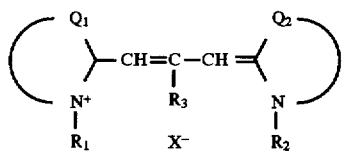

wherein each of $Q_1$ and $Q_2$ is a group of atoms necessary to complete a heterocyclic ring with the carbon and nitrogen atoms, the heterocyclic skeletons completed by $Q_1$ and $Q_2$ may be the same or different, each of $R_1$ and $R_2$ which may be the same or different is an aliphatic hydrocarbon radical, $R_3$ is a hydrogen atom or monovalent substituent, and $X^-$ is a monovalent anion.

(7) The optical recording medium of (6) wherein said dye B is a trimethineindolenine cyanine dye of the following formula (III):

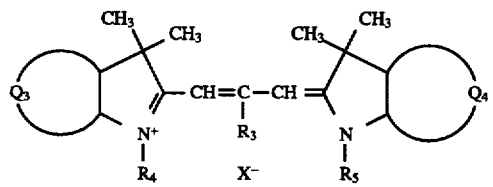

wherein each of $Q_3$ and $Q_4$ is a group of atoms necessary to complete an indolenine or benzoindolenine ring with the pyrrole ring, the rings completed by $Q_3$ and $Q_4$ may be the same or different, $R_3$ is a hydrogen atom or monovalent substituent, each of $R_4$ and $R_5$ is an alkyl radical, and $X^-$ is a monovalent anion.

(8) The optical recording medium of (7) wherein either one of the rings completed by $Q_3$ and $Q_4$ together with the pyrrole rings is an indolenine ring and the other is a benzoindolenine ring, and the benzene ring of the benzoindolenine ring is fused to the indolenine ring at the 4 and 5-positions thereof.

(9) The optical recording medium of (8) wherein the indolenine ring has a hydrogen atom, halogen atom or alkyl radical at the 5-position thereof.

(10) The optical recording medium of (7) wherein both the rings completed by $Q_3$ and $Q_4$ together with the pyrrole rings are benzoindolenine rings, and the benzene ring of each benzoindolenine ring is fused to the indolenine ring at the 4 and 5-positions thereof.

(11) The optical recording medium of (7) wherein $R_4$ and/or $R_5$ is an alkoxyalkyl radical.

(12) The optical recording medium of (1) wherein the ratio of dye A to dye B in said recording layer is from 80/20 to 20/80 on a weight basis.

(13) The optical recording medium of (1) wherein said recording layer has been formed using a coating solution containing dye A and dye B in a solvent which is an alkoxyalcohol.

(14) The optical recording medium of (6) wherein a singlet oxygen quencher is used as a stabilizer along with said trimethinecyanine dye.

(15) The optical recording medium of (14) wherein said singlet oxygen quencher is a metal-containing azo compound of the following formula (IV):

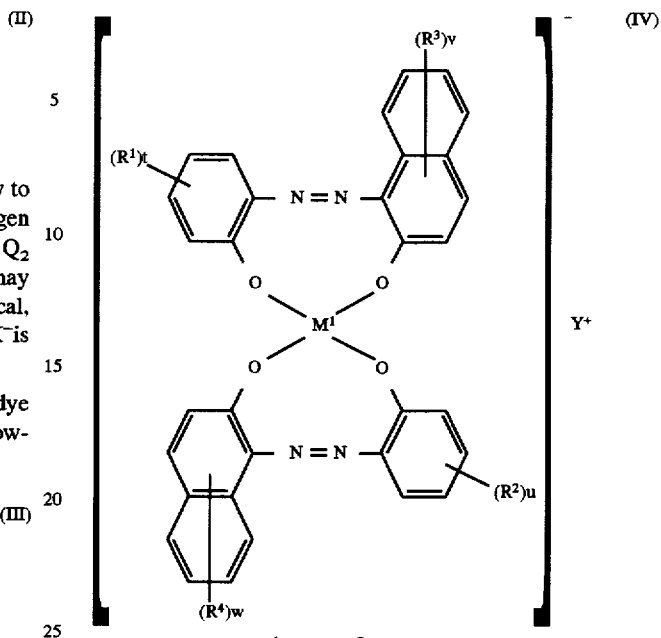

wherein each of $R^1$ and $R^2$ is selected from the group consisting of a nitro radical, halogen atom, amino radical, sulfamoyl radical, alkyl radical, and alkoxy radical, t and u each are 0 or an integer of 1 to 4, each of $R^3$ and $R^4$ is selected from the group consisting of a halogen atom, nitro radical, alkyl radical, alkoxy radical, and amino radical, v and w each are 0 or an integer of 1 to 6, $M^1$ is cobalt or nickel, and $Y^+$ is an alkyl-substituted ammonium ion, with the proviso that t, u, v and w are not equal to 0 at the same time, and the sum of t+u+v+w is 1 to 20.

(16) The optical recording medium of (15) wherein said trimethinecyanine dye and said metal-containing azo compound are mixed and the mixing ratio of said metal-containing azo compound to said trimethinecyanine dye is from 10/90 to 95/5 on a molar basis.

FUNCTION

The optical recording medium of the invention has a recording layer containing a dye on a substrate. Used in the recording layer are a dye A having a complex index of refraction at 780 nm whose real part n is 1.8 to 2.8 and imaginary part k is up to 0.15 and forming a dye thin film having an absorption spectrum whose half-value width is up to 170 nm and a dye B having a complex index of refraction at 630 nm or 650 nm whose real part n is 1.8 to 2.8 and imaginary part k is up to 0.2. The combined use of two dyes having such optical characteristics enables satisfactory writing and reading at both the conventional wavelength of about 780 nm and a shorter wavelength region (of about 630 nm to about 680 nm). More particularly, the dye A provides for a satisfactory reflectance and signal modulation at the conventional wavelength of about 780 nm since it has the above-defined n and k. Also the dye A does have no significant absorption in the short wavelength region and a reduced real part n of complex index of refraction since a thin film of dye A has an absorption spectrum whose half-value width is up to 170 nm. Accordingly, with the dye A, the signal modulation at short wavelength is so low that reading is impossible or the error rate is exacerbated. On the other hand, the dye B has the above-defined n and k. Since the absorption edge of the absorption spectrum of a thin film of dye A does not overlap the wavelength region of a short wavelength laser, the optical characteristics dye B possesses can be utilized without a loss or change and the reflectance in the short wavelength region is not reduced. Consequently, the reflectance and modulation at the short wavelength are fully high.

For the above-described reason, the dyes can be used in the recording layer of optical recording media corresponding to the CD standard and permit writing and reading with a short wavelength laser.

According to the invention, there is available an optical recording medium which can accommodate for two distinct wavelengths in that it has a reflectance of at least 65%, a modulation of at least 60%, and an Rtop of at least 65% in the conventional wavelength region of about 780 nm, which values satisfy the Orange Book standards, while it allows for writing and reading in a shorter wavelength region (of about 630 nm to about 680 nm).

EMBODIMENTS OF THE INVENTION

Embodiments of the invention are described below in detail.

The optical recording medium of the invention has a recording layer on a substrate and a reflecting layer on the recording layer.

The recording layer is a dye film containing dyes. Dye A and dye B are used as the dye.

Dye A has a complex index of refraction at 780 nm whose real part n is 1.8 to 2.8 and whose imaginary part (coefficient of extinction) k is up to 0.15, preferably 0.02 to 0.13. The use of a dye having such values of n and k provides for a satisfactory reflectance and signal modulation. In contrast, n of less than 1.8 results in a lower signal modulation and k in excess of 0.15 fails to provide a satisfactory reflectance. In fact, it is impossible to synthesize dyes with n in excess of 2.8.

It is noted that n and k of a dye is determined by preparing a test sample in which a dye film is formed on a given transparent substrate to a thickness equivalent to the recording layer of an optical recording medium, for example, of about 40 to 100 nm under the same conditions as used for the recording layer, measuring the test sample for reflectance and transmittance at 780 nm, and calculating n and k from these measurements according to Ishiguro Kozo, "Optics," Kyoritsu Publishing K.K., pages 168–178, for example. The reflectance is a reflectance of the test sample through the substrate or a reflectance of the sample from the dye film side while it is measured in a specular reflection mode (of the order of 5°).

Figure 1:
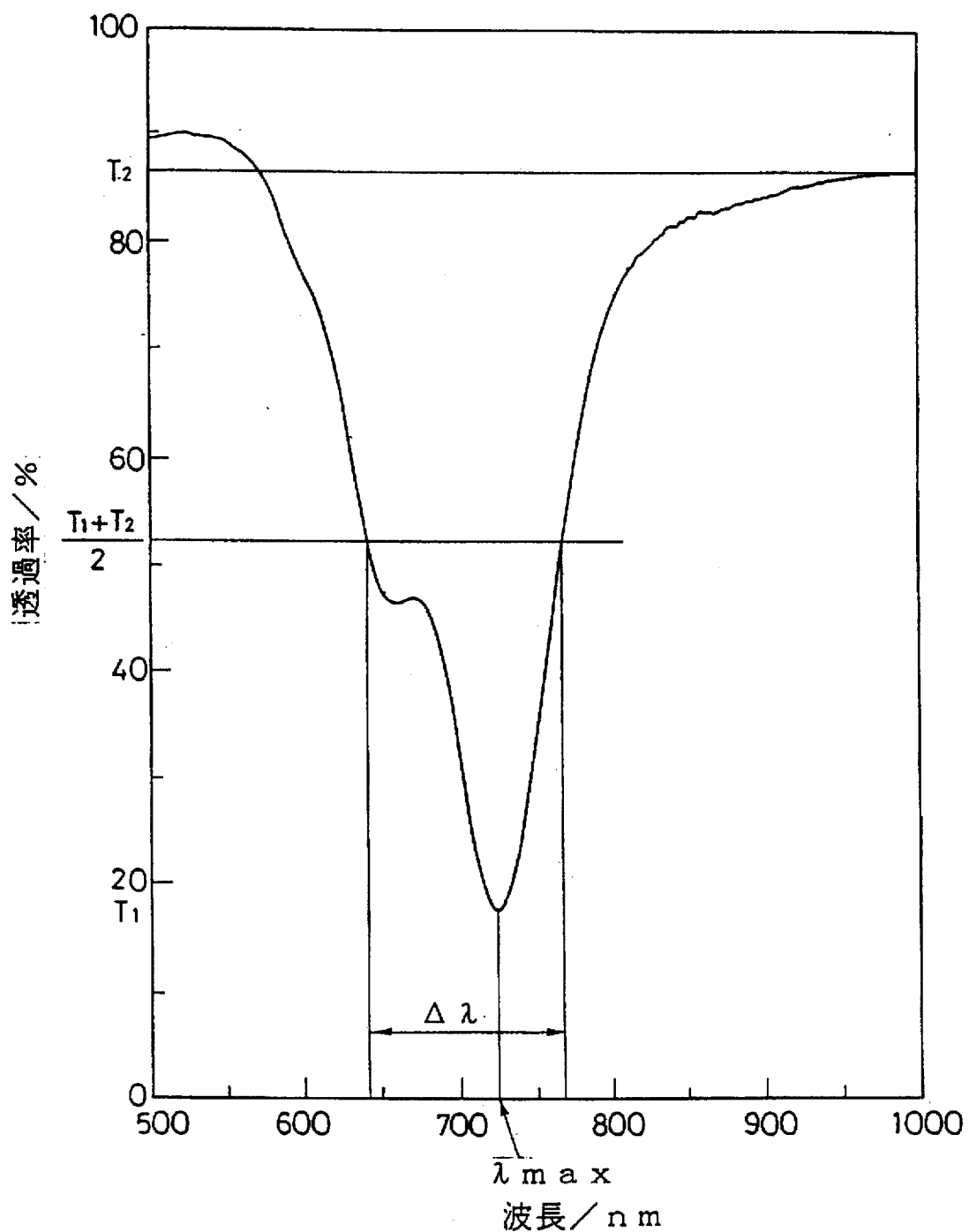
FIG. 1 is a graph for explaining how to determine the half-value width from an absorption spectrum of a thin film of a phthalocyanine dye in the practice of the invention.

Additionally, when an absorption spectrum of a dye thin film is measured, dye A exhibits an absorption maximum ($\lambda$max) at about 680 to 750 nm. The half-value width of the absorption spectrum, that is, the half-value width of a spectral line near $\lambda$ is up to 170 nm, preferably up to 150 nm. The lower limit of the half-value width is generally 50 nm though not critical. The use of a dye having such a half-value width eliminates any influence on the absorption characteristics of dye B so that a satisfactory reflectance and modulation in a short wavelength region are available. In contrast, if the half-value width exceeds 170 nm, the absorption edge overlaps the wavelength region of a short wavelength laser, causing a loss of reflectance in the short wavelength region. It is noted that the half-value width is determined by preparing a sample in which a dye film is formed on a transparent substrate such that the transmittance T at absorption maximum $\lambda$max is up to 25%, and measuring an absorption spectrum of the sample. Referring to the absorption spectrum of FIG. 1, for example, a transmittance T1 at $\lambda$max and a transmittance T2 which is substantially constant when the wavelength is shifted toward a longer wavelength side, that is, does not depend on a shift of wavelength are determined. The width $\Delta\lambda$ at one-half of the bottom depth measured from T2 as a base to T1 is the half-value width. The dye film as the sample is generally about 50 to 150 nm thick.

On the other hand, dye B used in combination with dye A has a complex index of refraction at 630 nm or 650 nm whose real part n is 1.8 to 2.8 and whose imaginary part k is up to 0.2, preferably 0 to 0.15. The use of a dye having such values of n and k provides for a satisfactory reflectance and signal modulation. In contrast, n of less than 1.8 results in a lower signal modulation and k in excess of 0.2 fails to provide a satisfactory reflectance. In fact, it is impossible to synthesize dyes with n in excess of 2.8. Herein, n and k are determined by the same procedure as used for dye A except that the measurement wavelength is 630 nm or 650 nm.

The ratio of dye A to dye B in the recording layer, dye A/dye B, is from 80/20 to 20/80 on a weight basis. A dye ratio within this range enables not only writing and reading at two wavelengths, a conventional wavelength and a shorter wavelength, but writing and reading separately at these two wavelengths. If either one of dye A and dye B is too much or too less, writing and reading at either one of the wavelengths would be unsuccessful. It is noted that for each of dyes A and B, only one dye or a mixture of dyes may be used. Where two or more dyes are used for each, their total amount should meet the above-defined weight ratio.

With respect to n and k, the recording layer has n=1.8 to 2.3 and k=0.03 to 0.20 at 630 nm or 650 nm and n=1.8 to 2.5 and k=0.03 to 0.15 at 780 nm, which suggests the possibility of effective writing and reading at a wavelength of about 630 to 680 nm and a wavelength of about 780 nm. These values of n and k are determined by the same procedure as those of the dye film mentioned above.

For dye A, it is preferred to use a dye which has so significant steric hindrance that association of molecules might be retarded when a thin film is formed. This is because a thin film of a dye whose molecules are unlikely to associate tends to exhibit an absorption spectrum having a smaller half-value width. Also such a dye is increased in solubility in preparing a dye-containing coating solution.

More specifically, dye A is preferably selected from phthalocyanine dyes, naphthalocyanine dyes, etc., with the phthalocyanine dyes being more preferred. Especially preferred is a phthalocyanine dye of the formula (I):

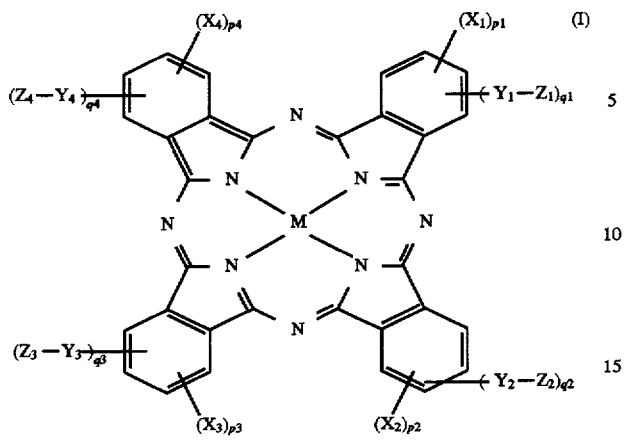

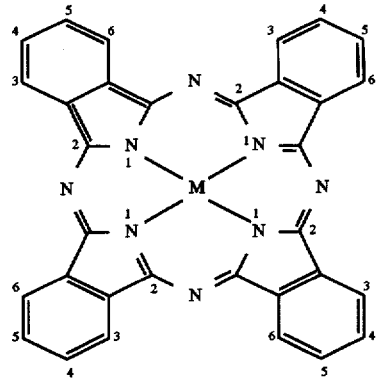

Formula (I) is described. In formula (I), M is a center atom. Included in the center atom represented by M are a hydrogen atom (2H) or a metal atom. Examples of the metal atom used herein are those in Groups 1 to 14 of the Periodic Table (Groups 1A to 7A, 8, and 1B to 4B). For example, mention is made of Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Zn, Cd, Hg, Al, In, Tl, Si, Ge, Sn and Pb, more specifically, Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Cd, Hg, Al, In, Tl, Si, Ge, Sn, and Pb. Preferred among these are Al, Si, Ge, Zn, Cu, Pd, Ni, Fe, and Co, especially Cu, Pd, Ni, Fe, Co, and VO for aging stability.

It is understood that these metal atoms, for instance, V may take the form of VO. Alternatively, the metal atom may have a ligand or ligands such as ether groups, ester groups, pyridine and derivatives thereof coordinated to the upper and/or lower sides or one lateral side, as in the case of Si, Al, Ge, Co, and Fe.

Each of $X_1$ to $X_4$ is a halogen atom, for example, F, Cl, Br, and I. Br and F are especially preferred.

Each of p1, p2, p3, and p4 is 0 or an integer of 1 to 4, and the sum of p1+p2+p3+p4 is 0 to 15, preferably 0 to 10.

$X_1$ to $X_4$ may be the same or different. Where each of p1, p2, p3, and p4 is an integer of 2 or more, $X_1$ radicals, $X_2$ radicals, $X_3$ radicals or $X_4$ radicals may be the same or different.

Each of $Y_1$ to $Y_4$ is an oxygen or sulfur atom, with the oxygen atom being especially preferred. $Y_1$ to $Y_4$ are generally the same though they may be different.

Each of $Z_1$ to $Z_4$ is an alkyl radical, alicyclic hydrocarbon radical, aromatic hydrocarbon radical or heterocyclic radical each having at least 4 carbon atoms, and they may be the same or different.

Each of q1, q2, q3, and q4 is 0 or an integer of 1 to 4, they are not equal to 0 at the same time, and the sum of q1+q2+q3+q4 is 1 to 8, preferably 2 to 6.

The position at which $Y_1$ to $Y_4$ are attached to the phthalocyanine ring is preferably the 3- and/or 6-position of the phthalocyanine ring as seen from the structural formula shown below, and the inclusion of at least one such bond is preferred.

The alkyl radicals represented by $Z_1$ to $Z_4$ are preferably those having 4 to 16 carbon atoms. These alkyl radicals may be either normal or branched although the branched ones are preferred. The alkyl radicals may have a substituent which is a halogen atom (such as F, Cl, Br, and I, especially F and Br), etc. Examples of the alkyl radical include n-$C_4H_9$—, i-$C_4H_9$—, s-$C_4H_9$—, t-$C_4H_9$—, n-$C_5H_{11}$—, $(CH_3)_2$CHCH$_2$CH$_2$—,(CH$_3$)$_3$CCH$_2$—, $(C_2H_5)_2$CH—, $C_2H_5$C$(CH_3)_2$—, n-$C_3H_7$CH(CH$_3$)—, n-$C_6H_{13}$—, $(CH_3)_2$CHCH$_2$CH$_2$CH$_2$—, (CH$_3$)$_3$C—CH$_2$—CH$_2$—, n-$C_3H_7$CH(CH$_3$)CH$_2$—, n-$C_4H_9$CH(CH$_3$)—, n-$C_7H_{15}$—, [(CH$_3$)$_2$CH]$_2$CH-, n-$C_4H_9$CH(CH$_3$)CH$_2$—, (CH$_3$)$_2$CHCH$_2$CH(CH$_3$)CH$_2$—, n-$C_8H_{17}$—, (CH$_3$)$_3$CCH$_2$CH(CH$_3$)CH$_2$—, (CH$_3$)$_2$CHCH(i-$C_4H_9$)—, n-$C_4H_9$ CH(C$_2H_5$)CH$_2$—, n-$C_9H_{19}$—, CH$_3$CH$_2$CH(CH$_3$)CH$_2$CH(CH$_3$) CH$_2$CH$_2$—, (CH$_3$)$_2$CHCH$_2$CH$_2$CH$_2$CH(CH$_2$)—, n-$C_3H_7$CH(CH$_3$)CH$_2$CH(CH$_3$)CH$_2$—, n-$C_{10}H_{21}$—, (CH$_3$)$_3$CCH$_2$CH$_2$C(CH$_3$)$_2$CH$_2$—, n-$C_{11}H_{23}$—, n-$C_{12}H_{25}$—, n-$C_{13}H_{27}$, n-$C_{14}H_{29}$—, n-$C_{15}H_{31}$—, n-$C_{16}H_{33}$—, n-$C_4F_9$—, i-$C_4F_9$—, s-$C_4F_9$—, and t-$C_4F_9$—.

The alicyclic hydrocarbon radicals represented by $Z_1$ to $Z_4$ include cyclohexyl, cyclopentyl and other radicals, with the cyclohexyl radical being preferred. These radicals may have a substituent which includes an alkyl radical, aryl radical, alkoxy radical, aryloxy radical, aralkyl radical, halogen atom, nitro radical, carboxyl radical, ester radical, acyl radical, amino radical, amide radical, carbamoyl radical, sulfonyl radical, sulfamoyl radical, sulfo radical, sulfino radical, arylazo radical, alkylthio radical, and arylthio radical. Preferred substituents are alkyl radicals having 1 to 5 carbon atoms (e.g., methyl, ethyl, n-propyl, iso-propyl, n-butyl, iso-butyl, sec-butyl, tert-butyl, n-pentyl, iso-pentyl, neo-pentyl, tert-pentyl, and 1-methylbutyl radicals), alkoxy radicals (e.g., methoxy, ethoxy, propoxy, isopropoxy, butoxy, isobutoxy, sec-butoxy, and tert-butoxy radicals), aryl radicals (e.g., phenyl, tolyl, biphenyl and naphthyl radicals), and halogen atoms (e.g., F, Cl, Br, and I, with F and Br being preferred). The replacement position of these substituents is preferably either one or both of the positions adjacent to the position of attachment to each of $Y_1$ to $Y_4$. The inclusion of at least one such substitution is preferred.

The aromatic hydrocarbon radicals represented by $Z_1$ to $Z_4$ may be a single ring or have a fused ring and may have a substituent. The total number of carbon atoms is preferably 6 to 20. Examples are phenyl and naphthyl radicals, with the phenyl radical being preferred. They may have a substituent while examples and preferred examples of the substituent are the same as exemplified for the alicyclic hydrocarbon radicals. The replacement position is also the same as previous, preferably ortho-position to the position of attachment to each of $Y_1$ to $Y_4$. The inclusion of at least one ortho-substitution is preferred.

The heterocyclic radicals represented by $Z_1$ to $Z_4$ may be a single ring or have a fused ring while the preferred hetero-atom is oxygen, nitrogen, sulfur, etc., with oxygen and nitrogen being especially preferred. Exemplary radicals include pyridyl, furanonyl, pyrazyl, pyrazolidyl, piperidinonyl, quinoxalyl, pyranonyl and thiophenetrionyl radicals, with the pyridyl and 2-furanonyl radicals being preferred. These heterocyclic radicals may further have a substituent while examples and preferred examples of the substituent are the same as exemplified for the alicyclic hydrocarbon and aromatic hydrocarbon radicals. Where there is a carbon atom adjacent to the position of attachment to each of $Y_1$ to $Y_4$, it is preferred to have a substituent at such an adjacent position.

Preferred for $Z_1$ to $Z_4$ are alicyclic hydrocarbon and aromatic hydrocarbon radicals, with cyclohexyl and phenyl radicals being especially preferred, while it is preferred to have a substituent (especially the preferred substituents mentioned above) at one or both of the positions adjacent the position of attachment to each of $Y_1$ to $Y_4$.

Illustrative examples of the phthalocyanine dye are shown below although the invention is not limited thereto. These illustrative examples are shown in terms of $X_{11}$ to $X_{14}$, $X_{15}$ to $X_{18}$, $X_{19}$ to $X_{22}$, $X_{23}$ to $X_{26}$ and M in the following formula (Ia). Where all of $X_{11}$ to $X_{14}$ etc. are hydrogen, it is shown by "H." Where any of $X_{11}$ to $X_{14}$ has a substituent, only the substituted one is shown, with the expression being omitted. It is understood that the 3 and 6-positions and the 4 and 5-positions of the phthalocyanine ring are equivalent to each other and where a substituent is present at either one of these positions, only one is shown as a representative example.

| Dye No. | $X_{11}$–$X_{14}$ | $X_{15}$–$X_{18}$ | $X_{19}$–$X_{22}$ | $X_{23}$–$X_{26}$ | M |
|---|---|---|---|---|---|
| A-1 | $X_{11}$=—O—⟨C(CH$_3$)$_3$, C(CH$_3$)$_3$⟩ | $X_{15}$=—O—⟨C(CH$_3$)$_3$, C(CH$_3$)$_3$⟩ | $X_{19}$=—O—⟨C(CH$_3$)$_3$, C(CH$_3$)$_3$⟩ | $X_{23}$=—O—⟨C(CH$_3$)$_3$, C(CH$_3$)$_3$⟩ | Cu |
| A-2 | $X_{11}$=—O—CH(CH(CH$_3$)$_2$)$_2$ | $X_{15}$=—O—CH(CH(CH$_3$)$_2$)$_2$ | $X_{19}$=—O—CH(CH(CH$_3$)$_2$)$_2$ | $X_{23}$=—O—CH(CH(CH$_3$)$_2$)$_2$ | Pd |
| A-3 | $X_{11}$=—O—cyclohexyl-C(CH$_3$)$_3$ | $X_{15}$=—O—cyclohexyl-C(CH$_3$)$_3$ | $X_{19}$=—O—cyclohexyl-C(CH$_3$)$_3$ | $X_{23}$=—O—cyclohexyl-C(CH$_3$)$_3$ | Cu |
| A-4 | $X_{11}$=—O—⟨C(CH$_3$)$_3$⟩ | $X_{15}$=—O—⟨C(CH$_3$)$_3$⟩ | $X_{19}$=—O—⟨C(CH$_3$)$_3$⟩ | $X_{23}$=—O—⟨C(CH$_3$)$_3$⟩ | Cu |

(Ia)

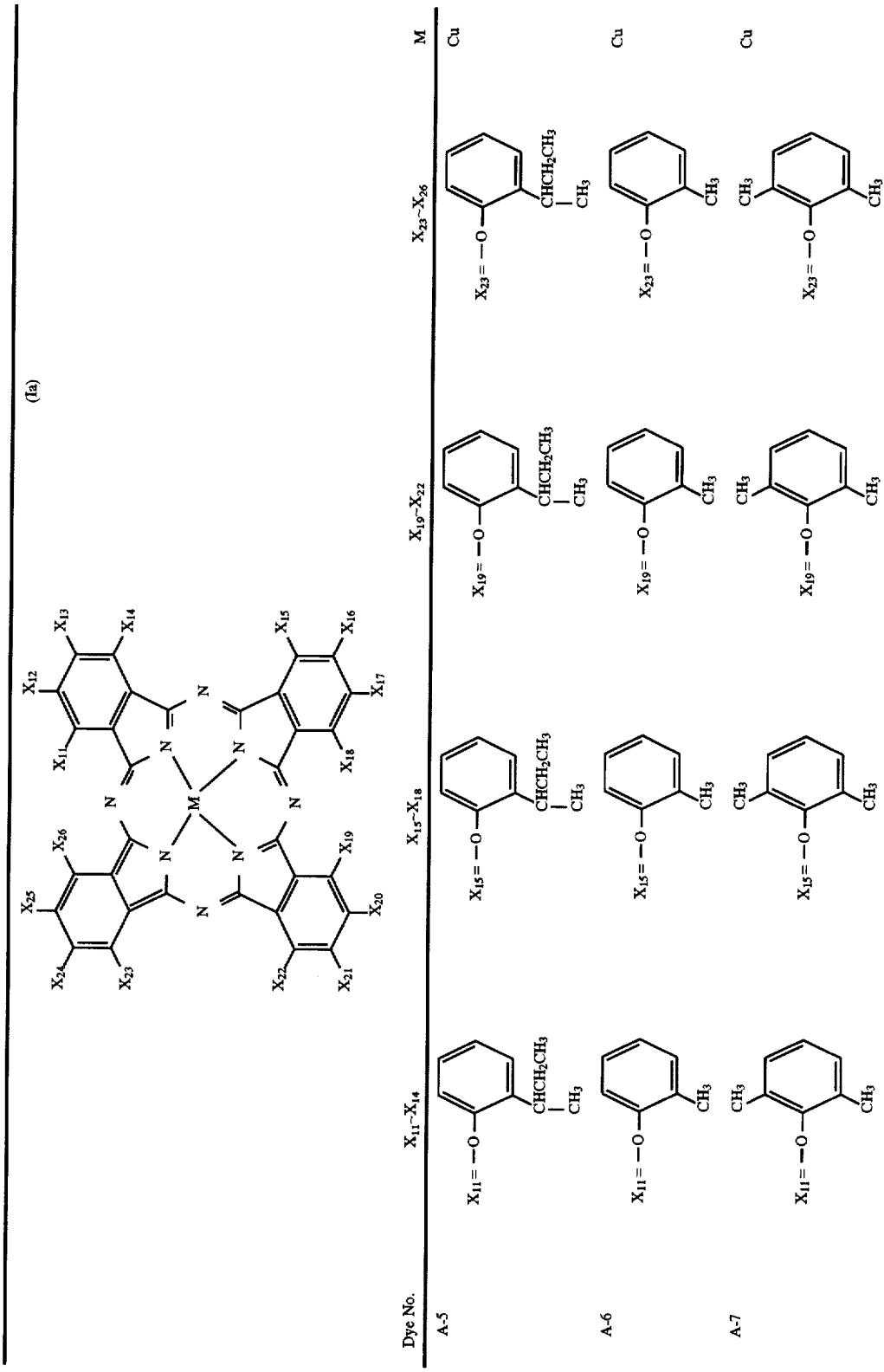

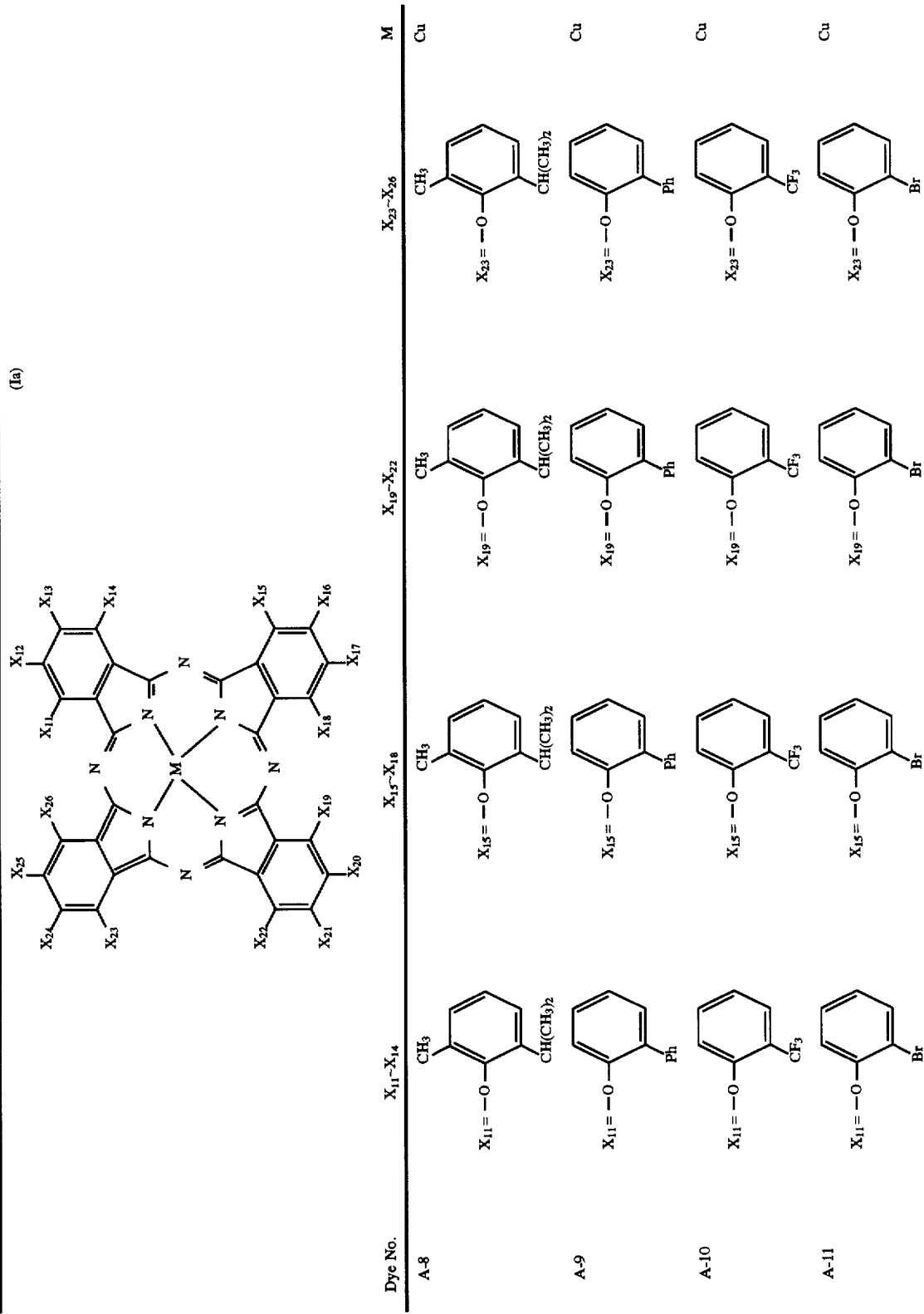

-continued (1a)

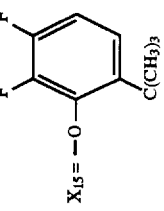

| Dye No. | $X_{11}$–$X_{14}$ | $X_{15}$–$X_{18}$ | $X_{19}$–$X_{22}$ | $X_{23}$–$X_{26}$ | M |
|---|---|---|---|---|---|
| A-12 | $X_{11}$=—O—, $X_{12}$=$X_{13}$=F, C(CH$_3$)$_3$ (with F, F on ring) | $X_{15}$=—O—, $X_{16}$=$X_{17}$=F, C(CH$_3$)$_3$ | $X_{19}$=—O—, $X_{20}$=$X_{21}$=F, C(CH$_3$)$_3$ | $X_{23}$=—O—, $X_{24}$=$X_{25}$=F, C(CH$_3$)$_3$ | Cu |
| A-13 | $X_{11}$=—O—, $X_{12}$=$X_{13}$=$X_{14}$=Br, C(CH$_3$)$_3$ | $X_{15}$=—O—, $X_{16}$=$X_{17}$=$X_{18}$=Br, C(CH$_3$)$_3$ | $X_{19}$=—O—, $X_{20}$=$X_{21}$=$X_{22}$=Br, C(CH$_3$)$_3$ | $X_{23}$=—O—, $X_{24}$=$X_{25}$=$X_{26}$=Br, C(CH$_3$)$_3$ | Cu |
| A-14 | $X_{11}$=$X_{14}$=—O—, $X_{12}$=$X_{13}$=F, Ph | $X_{15}$=$X_{18}$=—O—, $X_{16}$=$X_{17}$=F, Ph | $X_{19}$=$X_{22}$=—O—, $X_{20}$=$X_{21}$=F, Ph | $X_{23}$=$X_{26}$=—O—, $X_{24}$=$X_{25}$=F, Ph | Cu |

-continued (Ia)

[Structure: phthalocyanine-type macrocycle with central metal M, bearing substituents $X_{11}$–$X_{26}$ on four benzene rings]

| Dye No. | $X_{11}$–$X_{14}$ | $X_{15}$–$X_{18}$ | $X_{19}$–$X_{22}$ | $X_{23}$–$X_{26}$ | M |
|---|---|---|---|---|---|
| A-15 | $X_{11}=$—O—(2-C(CH$_3$)$_3$-phenyl) | H | $X_{19}=$—O—(2-C(CH$_3$)$_3$-phenyl) | H | Cu |
| A-16 | $X_{11}=X_{14}=$—O—(2-C(CH$_3$)$_3$-phenyl) | H | $X_{19}=X_{22}=$—O—(2-C(CH$_3$)$_3$-phenyl) | $X_{23}=X_{26}=$—O—(2-C(CH$_3$)$_3$-phenyl) | Cu |
| A-17 | $X_{11}=X_{14}=$—O—(2-C(CH$_3$)$_3$-phenyl) | H | $X_{19}=X_{22}=$—O—(2-C(CH$_3$)$_3$-phenyl) | H | Cu |
| A-18 | $X_{11}=$—S—(2-C(CH$_3$)$_3$-phenyl) | $X_{15}=$—S—(2-C(CH$_3$)$_3$-phenyl) | $X_{19}=$—S—(2-C(CH$_3$)$_3$-phenyl) | $X_{23}=$—S—(2-C(CH$_3$)$_3$-phenyl) | Cu |

-continued (Ia)

| Dye No. | $X_{11}$~$X_{14}$ | $X_{15}$~$X_{18}$ | $X_{19}$~$X_{22}$ | $X_{23}$~$X_{26}$ | M |
|---|---|---|---|---|---|
| A-19 | $X_{11}$=—O— (2-CH$_3$, 6-C(CH$_3$)$_3$ phenyl) | $X_{15}$=—O— (2-CH$_3$, 6-C(CH$_3$)$_3$ phenyl) | $X_{19}$=—O— (2-CH$_3$, 6-C(CH$_3$)$_3$ phenyl) | $X_{23}$=—O— (2-CH$_3$, 6-C(CH$_3$)$_3$ phenyl) | Pd |
| A-20 | $X_{11}$=—O— (2-CH$_3$, 6-C(CH$_3$)$_3$ phenyl) | $X_{15}$=—O— (2-CH$_3$, 6-C(CH$_3$)$_3$ phenyl) | $X_{19}$=—O— (2-CH$_3$, 6-C(CH$_3$)$_3$ phenyl) | $X_{23}$=—O— (2-CH$_3$, 6-C(CH$_3$)$_3$ phenyl) | Ni |
| A-21 | $X_{11}$=—O— (2-CH$_3$, 6-C(CH$_3$)$_3$ phenyl) | $X_{15}$=—O— (2-CH$_3$, 6-C(CH$_3$)$_3$ phenyl) | $X_{19}$=—O— (2-CH$_3$, 6-C(CH$_3$)$_3$ phenyl) | $X_{23}$=—O— (2-CH$_3$, 6-C(CH$_3$)$_3$ phenyl) | Fe |

-continued (Ia)

[Structure of formula (Ia): a metal complex with central M coordinated to four N atoms, with substituents X11–X26 on four phenyl rings]

| Dye No. | X11–X14 | X15–X18 | X19–X22 | X23–X26 | M |
|---|---|---|---|---|---|
| A-22 | X11—O—(2-CH3, 6-C(CH3)3 phenyl) | X15—O—(2-CH3, 6-C(CH3)3 phenyl) | X19—O—(2-CH3, 6-C(CH3)3 phenyl) | X23—O—(2-CH3, 6-C(CH3)3 phenyl) | Co |
| A-23 | X11—O—(2-CH3, 6-C(CH3)3 phenyl) | X15—O—(2-CH3, 6-C(CH3)3 phenyl) | X19—O—(2-CH3, 6-C(CH3)3 phenyl) | X23—O—(2-CH3, 6-C(CH3)3 phenyl) | VO |
| A-24 | X11—O—(3,5-di-C(CH3)3 cyclohexyl) | X15—O—(3,5-di-C(CH3)3 cyclohexyl) | X19—O—(3,5-di-C(CH3)3 cyclohexyl) | X23—O—(3,5-di-C(CH3)3 cyclohexyl) | Cu |

-continued (Ia)

| Dye No. | $X_{11}\sim X_{14}$ | $X_{15}\sim X_{18}$ | $X_{19}\sim X_{22}$ | $X_{23}\sim X_{26}$ | M |
|---|---|---|---|---|---|
| A-25 | $X_{11}=-O-$, cyclohexyl with $-CH(CH_2CH_3)-CH_3$ | $X_{15}=-O-$, cyclohexyl with $-CH(CH_2CH_3)-CH_3$ | $X_{19}=-O-$, cyclohexyl with $-CH(CH_2CH_3)-CH_3$ | $X_{23}=-O-$, cyclohexyl with $-CH(CH_2CH_3)-CH_3$ | Cu |
| A-26 | $X_{11}=-O-$, cyclohexyl with $CH_3$ | $X_{15}=-O-$, cyclohexyl with $CH_3$ | $X_{19}=-O-$, cyclohexyl with $CH_3$ | $X_{23}=-O-$, cyclohexyl with $CH_3$ | Cu |
| A-27 | $X_{11}=-O-$, cyclohexyl with 2,6-di-$CH_3$ | $X_{15}=-O-$, cyclohexyl with 2,6-di-$CH_3$ | $X_{19}=-O-$, cyclohexyl with 2,6-di-$CH_3$ | $X_{23}=-O-$, cyclohexyl with 2,6-di-$CH_3$ | Cu |

-continued (Ia)

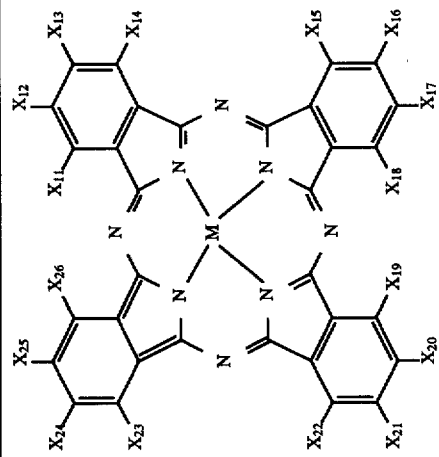

| Dye No. | $X_{11}$~$X_{14}$ | $X_{15}$~$X_{18}$ | $X_{19}$~$X_{22}$ | $X_{23}$~$X_{26}$ | M |
|---|---|---|---|---|---|
| A-28 | $X_{11}$=—O—, cyclohexyl with CH$_3$ and CH(CH$_3$)$_2$ | $X_{15}$=—O—, cyclohexyl with CH$_3$ and CH(CH$_3$)$_2$ | $X_{19}$=—O—, cyclohexyl with CH$_3$ and CH(CH$_3$)$_2$ | $X_{23}$=—O—, cyclohexyl with CH$_3$ and CH(CH$_3$)$_2$ | Cu |
| A-29 | $X_{11}$=—O—, cyclohexyl with Ph | $X_{15}$=—O—, cyclohexyl with Ph | $X_{19}$=—O—, cyclohexyl with Ph | $X_{23}$=—O—, cyclohexyl with Ph | Cu |
| A-30 | $X_{11}$=—O—, cyclohexyl with CF$_3$ | $X_{15}$=—O—, cyclohexyl with CF$_3$ | $X_{19}$=—O—, cyclohexyl with CF$_3$ | $X_{23}$=—O—, cyclohexyl with CF$_3$ | Cu |
| A-31 | $X_{11}$=—O—, cyclohexyl with Br | $X_{15}$=—O—, cyclohexyl with Br | $X_{19}$=—O—, cyclohexyl with Br | $X_{23}$=—O—, cyclohexyl with Br | Cu |

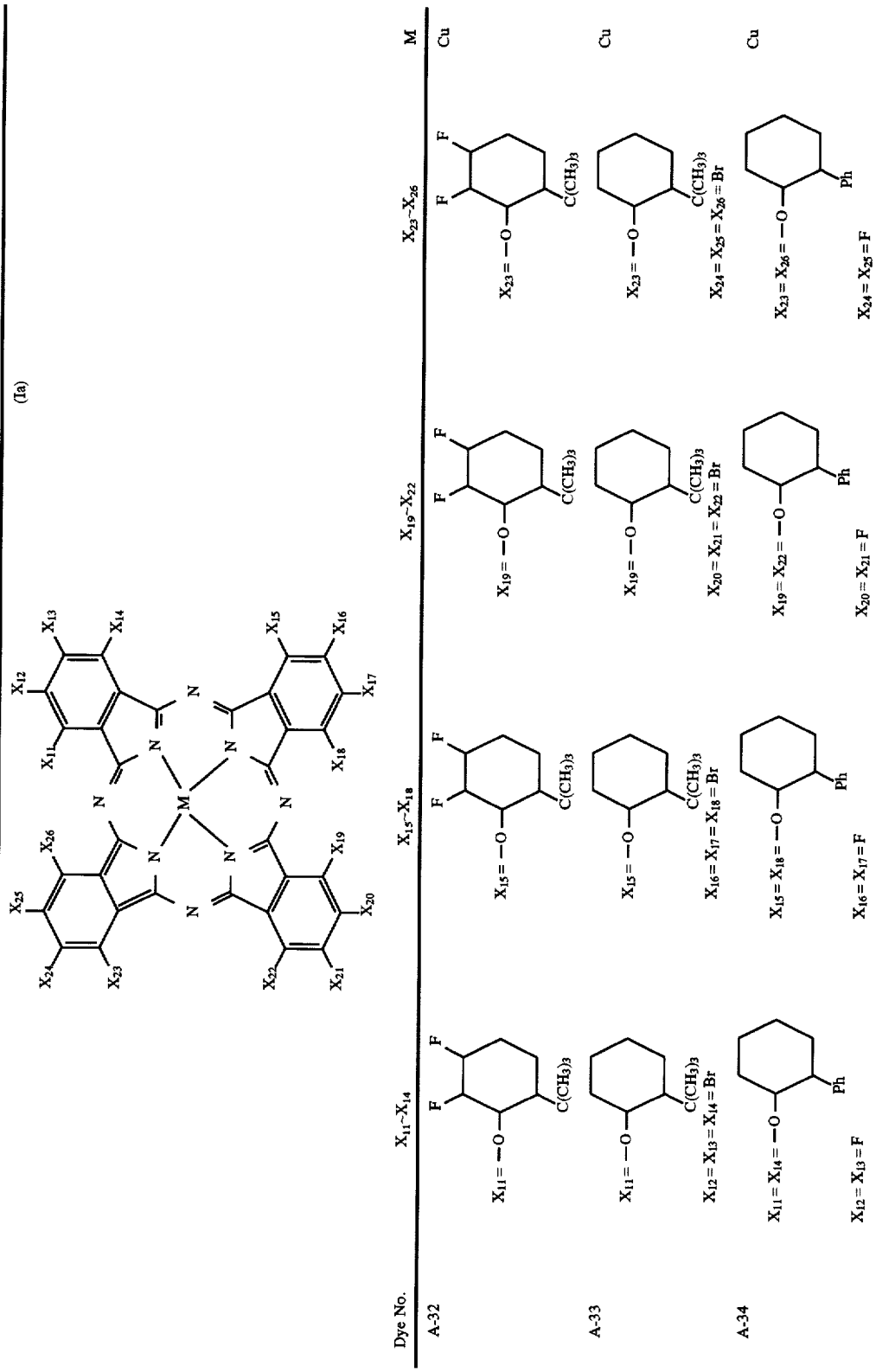

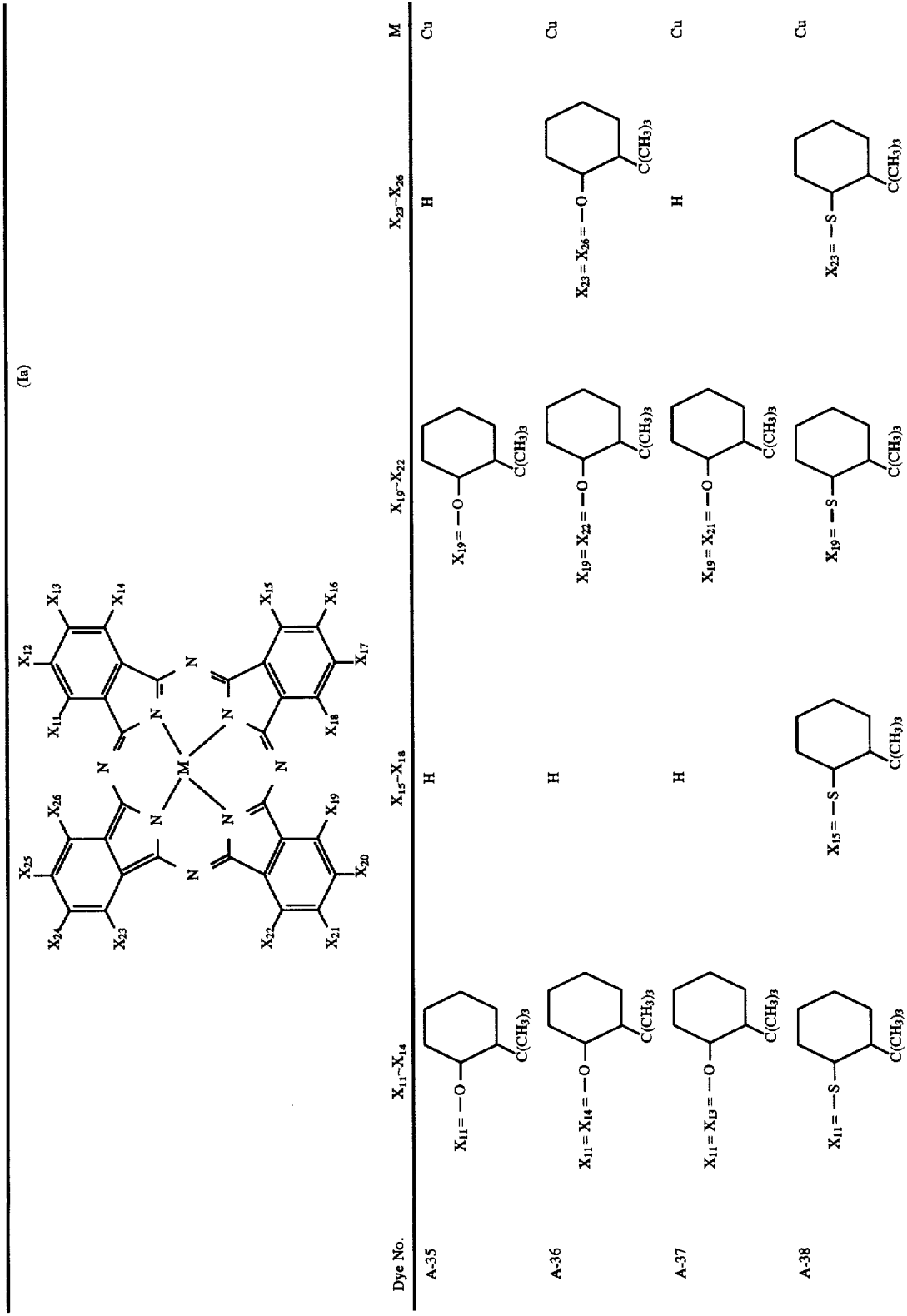

-continued (Ia)

[Structure of formula (Ia): a metal complex with central M coordinated to four N atoms, each N connected to benzene rings bearing substituents $X_{11}$–$X_{26}$]

| Dye No. | $X_{11}$–$X_{14}$ | $X_{15}$–$X_{18}$ | $X_{19}$–$X_{22}$ | $X_{23}$–$X_{26}$ | M |
|---|---|---|---|---|---|
| A-39 | $X_{11}$=—O—, cyclohexane with $CH_3$ and $C(CH_3)_3$ | $X_{15}$=—O—, cyclohexane with $CH_3$ and $C(CH_3)_3$ | $X_{19}$=—O—, cyclohexane with $CH_3$ and $C(CH_3)_3$ | $X_{23}$=—O—, cyclohexane with $CH_3$ and $C(CH_3)_3$ | Pd |
| A-40 | $X_{11}$=—O—, cyclohexane with $CH_3$ and $C(CH_3)_3$ | $X_{15}$=—O—, cyclohexane with $CH_3$ and $C(CH_3)_3$ | $X_{19}$=—O—, cyclohexane with $CH_3$ and $C(CH_3)_3$ | $X_{23}$=—O—, cyclohexane with $CH_3$ and $C(CH_3)_3$ | Ni |
| A-41 | $X_{11}$=—O—, cyclohexane with $CH_3$ and $C(CH_3)_3$ | $X_{15}$=—O—, cyclohexane with $CH_3$ and $C(CH_3)_3$ | $X_{19}$=—O—, cyclohexane with $CH_3$ and $C(CH_3)_3$ | $X_{23}$=—O—, cyclohexane with $CH_3$ and $C(CH_3)_3$ | Fe |

-continued (Ia)

| Dye No. | $X_{11}$-$X_{14}$ | $X_{15}$-$X_{18}$ | $X_{19}$-$X_{22}$ | $X_{23}$-$X_{26}$ | M |
|---|---|---|---|---|---|
| A-42 | $X_{11}$=O, cyclohexyl with CH$_3$ and C(CH$_3$)$_3$ | $X_{15}$=O, cyclohexyl with CH$_3$ and C(CH$_3$)$_3$ | $X_{19}$=O, cyclohexyl with CH$_3$ and C(CH$_3$)$_3$ | $X_{23}$=O, cyclohexyl with CH$_3$ and C(CH$_3$)$_3$ | Co |
| A-43 | $X_{11}$=O, cyclohexyl with CH$_3$ and C(CH$_3$)$_3$ | $X_{15}$=O, cyclohexyl with CH$_3$ and C(CH$_3$)$_3$ | $X_{19}$=O, cyclohexyl with CH$_3$ and C(CH$_3$)$_3$ | $X_{23}$=O, cyclohexyl with CH$_3$ and C(CH$_3$)$_3$ | VO |
| A-44 | $X_{11}$=O, cyclohexyl with C(CH$_3$)$_3$ | $X_{15}$=O, cyclohexyl with CH$_3$ and C(CH$_3$)$_3$ | $X_{19}$=O, cyclohexyl with C(CH$_3$)$_3$ | $X_{23}$=O, cyclohexyl with CH$_3$ and C(CH$_3$)$_3$ | Cu |

| Dye No. | $X_{11}$~$X_{14}$ | $X_{15}$~$X_{18}$ | $X_{19}$~$X_{22}$ | $X_{23}$~$X_{26}$ | M |
|---|---|---|---|---|---|
| A-45 | 2-methyl-3-pyridyloxy ($X_{11}$=O−) | 2-methyl-3-pyridyloxy ($X_{15}$=O−) | 2-methyl-3-pyridyloxy ($X_{19}$=O−) | 2-methyl-3-pyridyloxy ($X_{23}$=O−) | Cu |
| A-46 | tetronic acid-Ph ($X_{11}$=O−) | tetronic acid-Ph ($X_{15}$=O−) | tetronic acid-Ph ($X_{19}$=O−) | tetronic acid-Ph ($X_{23}$=O−) | Cu |
| A-47 | $X_{11}=-OCHCH(CH_3)_2$ $CH_2CH(CH_3)_2$ | $X_{15}=-OCHCH(CH_3)_2$ $CH_2CH(CH_3)_2$ | $X_{19}=-OCHCH(CH_3)_2$ $CH_2CH(CH_3)_2$ | $X_{23}=-OCHCH(CH_3)_2$ $CH_2CH(CH_3)_2$ | Cu |
| A-48 | $X_{11}=-OCH_2CHC_4H_9$ $C_2H_6$ | $X_{15}=-OCH_2CHC_4H_9$ $C_2H_6$ | $X_{19}=-OCH_2CHC_4H_9$ $C_2H_6$ | $X_{23}=-OCH_2CHC_4H_9$ $C_2H_6$ | Cu |
| A-49 | $X_{11}=-OCHCH(CH_3)_2$ $CH_3$ | $X_{15}=-OCHCH(CH_3)_2$ $CH_3$ | $X_{19}=-OCHCH(CH_3)_2$ $CH_3$ | $X_{23}=-OCHCH(CH_3)_2$ $CH_3$ | Ni |
| A-50 | $X_{11}=-OCHCH(CH_3)_2$ $CH_2CH(CH_3)_2$ | $X_{15}=-OCHCH(CH_3)_2$ $CH_2CH(CH_3)_2$ | $X_{19}=-OCHCH(CH_3)_2$ $CH_2CH(CH_3)_2$ | $X_{23}=-OCHCH(CH_3)_2$ $CH_2CH(CH_3)_2$ | Cu |

-continued
| Dye No. | $X_{11}-X_{14}$ | $X_{15}-X_{18}$ | $X_{19}-X_{22}$ | $X_{23}-X_{26}$ | M |
|---|---|---|---|---|---|
| A-51 | $X_{11}=-O-\phantom{|}$—C₆H₄—C(CH₃)₃ | $X_{15}=-O-\phantom{|}$—C₆H₄—C(CH₃)₃ | $X_{19}=-O-\phantom{|}$—C₆H₄—C(CH₃)₃ | $X_{23}=-O-\phantom{|}$—C₆H₄—C(CH₃)₃ | Co |
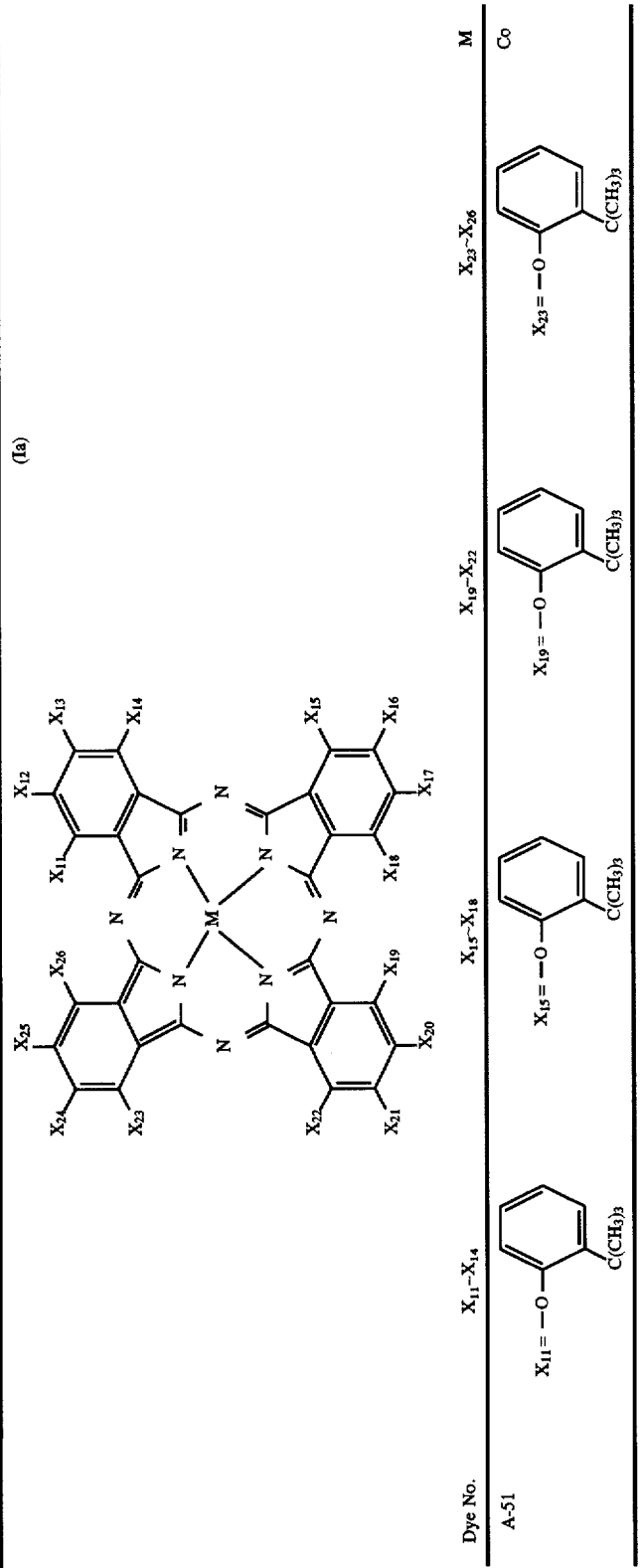
(Ia)

These phthalocyanine dyes may be synthesized in the light of methods as disclosed in JP-A 313760/1988, JP-A 301261/1988, etc.

Synthesis examples are given below.

Synthesis Example 1

Synthesis of Dye No. A-1

In 5 ml of dimethylformamide (DMF), 1.73 g of 1,2-dicyano -3-nitrobenzene and 4.12 g of 2,4-di-tert-butylhydroxybenzene were reacted at 80° C. for 2 hours while 5.0 g of $K_2CO_3$ was added. After the completion of reaction, the reaction product was extracted twice with a mixed solvent of water and ethyl acetate (in a volume ratio of 1/1). The ethyl acetate extracted layer was dried overnight over $MgSO_4$ and the ethyl acetate was distilled off. The residue was isolated and purified by silica gel column chromatography using chloroform, obtaining 2.65 g of 1,2-dicyano-3-(2,4 -tert-butylphenyloxy)benzene (yield 80%).

Then, 1.66 g of this compound and 0.20 g of CuCl in 10 ml of amyl alcohol were heated under reflux for reaction at 200° C. for 5 hours in the presence of 1.52 g of 1,8-diazabicyclo[5.4.0]-7-undecene (DBU). The resulting reaction product was isolated by silica gel column chromatography using chloroform, obtaining 1.22 g of the end product (yield 70%, mp 285°–290° C.).

Synthesis Example 2

Synthesis of Dye No. A-3

As in Synthesis Example 1, this was synthesized by the following procedure.

In 5 ml of dimethylformamide (DMF), 1.73 g of 1,2-dicyano-3-nitrobenzene and 4.68 g of 2-tert-butylcyclohexanol were reacted at 80° C. for 2 hours while 5.0 g of $K_2CO_3$ was added. After the completion of reaction, the reaction product was extracted twice with a mixed solvent of water and ethyl acetate (in a volume ratio of 1/1). The ethyl acetate extracted layer was dried overnight over $MgSO_4$ and the ethyl acetate was distilled off. The residue was isolated and purified by silica gel column chromatography using chloroform, obtaining 1.41 g of 1,2-dicyano-2-tert-butylcyclohexyloxy)benzene (yield 50%).

Then, 1.41 g of this compound and 0.14 g of CuCl in 10 ml of amyl alcohol were heated under reflux for reaction at 200° C. for 5 hours in the presence of 0.76 g of 1,8-diazabicyclo[5.4.0]-7-undecene (DBU). The resulting reaction product was isolated by silica gel column chromatography using chloroform, obtaining 0.97 g of the end product (yield 65%, mp 220°–222° C.).

Other exemplified dyes were synthesized as mentioned above or in accordance with the same or approximately the same procedure as above (yield about 45 to about 80%).

These dyes may be identified by elementary analysis, visible light absorption spectra, infrared absorption spectra, mass spectra, nuclear magnetic resonance absorption spectra, etc.

These dyes have a melting point (mp) of 60° to 400° C.

These phthalocyanine dyes have n and k at 780 nm as reported in Tables 1 and 2. These values of n and k were determined from a dye film of 80 nm thick. The half-value width of an absorption spectrum of a dye thin film was also determined,as mentioned above, with the results being reported together with λmax (thin film).

TABLE 1

| Dye No. | n (780 nm) | k (780 nm) | λmax, nm (absorption spectrum) | Half-value width, nm (absorption spectrum) |
|---|---|---|---|---|
| A-1 | 2.2 | 0.08 | 724 | 130 |
| A-2 | 2.3 | 0.05 | 715 | 140 |
| A-3 | 2.4 | 0.10 | 725 | 125 |
| A-4 | 2.3 | 0.10 | 724 | 130 |
| A-5 | 2.3 | 0.11 | 724 | 125 |
| A-6 | 2.4 | 0.10 | 725 | 130 |
| A-7 | 2.3 | 0.09 | 723 | 120 |
| A-8 | 2.2 | 0.10 | 725 | 140 |
| A-9 | 2.2 | 0.10 | 723 | 120 |
| A-10 | 2.3 | 0.11 | 723 | 130 |
| A-11 | 2.2 | 0.11 | 723 | 125 |
| A-12 | 2.1 | 0.10 | 726 | 125 |
| A-13 | 2.2 | 0.10 | 727 | 125 |
| A-14 | 2.2 | 0.10 | 725 | 125 |
| A-15 | 2.2 | 0.11 | 723 | 130 |
| A-16 | 2.3 | 0.12 | 725 | 130 |
| A-17 | 2.3 | 0.10 | 723 | 125 |
| A-18 | 2.3 | 0.09 | 725 | 125 |
| A-19 | 2.2 | 0.05 | 715 | 130 |
| A-20 | 2.2 | 0.08 | 720 | 130 |
| A-21 | 2.2 | 0.07 | 718 | 135 |
| A-22 | 2.2 | 0.08 | 720 | 140 |
| A-23 | 2.2 | 0.13 | 730 | 120 |
| A-24 | 2.2 | 0.11 | 725 | 125 |
| A-25 | 2.2 | 0.10 | 726 | 125 |

TABLE 2

| Dye No. | n (780 nm) | k (780 nm) | λmax, nm (absorption spectrum) | Half-value width, nm (absorption spectrum) |
|---|---|---|---|---|
| A-26 | 2.3 | 0.09 | 725 | 130 |
| A-27 | 2.3 | 0.09 | 720 | 135 |
| A-28 | 2.4 | 0.09 | 725 | 130 |
| A-29 | 2.3 | 0.10 | 720 | 125 |
| A-30 | 2.4 | 0.11 | 723 | 125 |
| A-31 | 2.3 | 0.10 | 721 | 125 |
| A-32 | 2.2 | 0.11 | 722 | 130 |
| A-33 | 2.3 | 0.10 | 724 | 125 |
| A-34 | 2.4 | 0.10 | 725 | 130 |
| A-35 | 2.4 | 0.10 | 721 | 125 |
| A-36 | 2.4 | 0.10 | 722 | 135 |
| A-37 | 2.3 | 0.09 | 725 | 140 |
| A-38 | 2.3 | 0.09 | 725 | 135 |
| A-39 | 2.3 | 0.07 | 715 | 135 |
| A-40 | 2.3 | 0.08 | 720 | 135 |
| A-41 | 2.3 | 0.08 | 720 | 125 |
| A-42 | 2.3 | 0.08 | 720 | 135 |
| A-43 | 2.2 | 0.09 | 728 | 140 |
| A-44 | 2.2 | 0.09 | 728 | 140 |
| A-45 | 2.2 | 0.09 | 726 | 135 |
| A-46 | 2.2 | 0.10 | 727 | 140 |
| A-47 | 2.2 | 0.09 | 723 | 130 |
| A-48 | 2.2 | 0.10 | 725 | 135 |
| A-49 | 2.3 | 0.08 | 718 | 140 |
| A-50 | 2.2 | 0.10 | 726 | 125 |
| A-51 | 2.2 | 0.07 | 718 | 130 |

It is noted that dyes A may be used alone or in admixture of two or more as previously mentioned. Where two or more dyes are combined, they may be selected such that a mixture may have n, k, and a half-value width of thin film absorption spectrum within the previously mentioned ranges.

Next, dye B is not critical insofar as it satisfies n and k in the above-mentioned ranges, included are trimethinecyanine dyes, metal complex dyes, styryl dyes, porphyrin dyes, azo dyes, azo metal complex dyes, and formazan metal complexes. These dyes may be used alone or in admixture of two or more as previously mentioned. Where two or more dyes are combined, they may be selected such that a mixture may have n and k within the previously mentioned ranges.

Among these dyes, trimethinecyanine dyes etc. are used for availability. The trimethinecyanine dyes are typically of the formula (II).

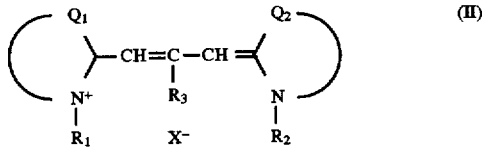

Formula (II) is described. In formula (II), each of $Q_1$ and $Q_2$ is a group of atoms necessary to complete a heterocyclic ring with the carbon and nitrogen atoms, the heterocyclic skeletons completed by $Q_1$ and $Q_2$ may be the same or different, with the same skeletons being preferred from the standpoint of synthesis. For these heterocyclic skeletons, mention is preferably made of benzothiazole, thiazole, oxazole, benzoxazole, pyridine, quinoline, imidazole, indolenine, benzoindolenine, and dibenzoindolenine skeletons.

The heterocyclic skeleton completed by $Q_1$ or $Q_2$ may have a substituent, which includes halogen atoms, alkyl, aryl, acyl, and amino radicals.

Each of $R_1$ and $R_2$ is an aliphatic hydrocarbon radical, and they may be the same or different. Examples of the aliphatic hydrocarbon radical include alkyl and cycloalkyl radicals. Preferred alkyl radicals are those having 1 to 4 carbon atoms, for example, methyl, ethyl, propyl and butyl radicals. Examples of the cycloalkyl radical are cyclohexyl and other radicals. They may have a substituent. Examples of the substituent include halogen atoms, alkyl radicals, aryl radicals, ether radicals including alkoxy radicals, ester radicals, and heterocyclic radicals. Among others, unsubstituted alkyl radicals are preferred, with methyl, ethyl and butyl radicals being especially preferred. From the standpoint of solubility in coating solvents, alkoxyalkyl radicals having an ether bond, especially alkoxyalkyl radicals having 3 to 6 carbon atoms in total are preferred.

$R_3$ is a hydrogen atom or monovalent substituent. Examples of the monovalent substituent include alkyl, aryl, azo, ester, acyl radicals, halogen atoms and heterocyclic radicals. Among these monovalent radicals, the alkyl, aryl, azo, ester, acyl, and heterocyclic radicals may have a substituent. Where they have a substituent, exemplary substituents are halogen atoms, alkyl, alkoxy, amino, heterocyclic and nitro radicals.

$X^-$ is a monovalent anion, for example, $ClO_4^-$, $I^-$, $BF_4^-$, $PF_6^-$, $SbF_6^-$, and para-toluenesulfonate ion.

Preferred among the trimethinecyanine dyes of formula (II) are trimethineindolenine cyanine dyes of formula (III).

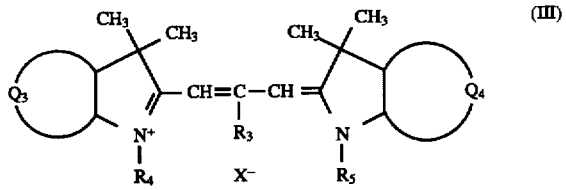

Formula (III) is described. In formula (III), each of $Q_3$ and $Q_4$ is a group of atoms necessary to complete an indolenine or benzoindolenine ring with the pyrrole ring, the rings completed by $Q_3$ and $Q_4$ may be the same or different. The indolenine or benzoindolenine ring may have a substituent, which includes halogen atoms, alkyl, aryl, acyl, and amino radicals.

Where the ring completed by $Q_3$ or $Q_4$ is a benzoindolenine ring, the position of fusion of the benzene ring to the indolenine ring is not critical although the benzene ring is preferably fused to the indolenine ring at its 4 and 5-positions (see formula (IIIa) shown later).

Specifically, a combination of $Q_3$ and $Q_4$ wherein one is an indolenine ring and the other is a benzoindolenine ring is preferred when the dyes are commensurate with 630 to 640 nm. A combination of $Q_3$ and $Q_4$ wherein both are benzoindolenine rings is preferred when the dyes are commensurate with from more than 640 to 680 nm.

$R_3$ is a hydrogen atom or monovalent substituent, which is as defined for $R_3$ in formula (II). $R_3$ is preferably a hydrogen atom.

Each of $R_4$ and $R_5$ is an alkyl radical. The alkyl radical may have a substituent and preferably has 1 to 4 carbon atoms. The substituents are as previously exemplified for the substituent on $R_1$ and $R_2$, with alkoxy radicals being especially preferred. Examples of the alkyl radical represented by $R_4$ and $R_5$ include methyl, ethyl, n- and i-propyl, n-, i-, s- and t-butyl, methoxymethyl, methoxyethyl, and ethoxyethyl radicals.

Unsubstituted alkyl and alkoxyalkyl radicals are preferred for $R_4$ and $R_5$. In a sense of improving solubility in coating solvents, it is preferred that at least one of $R_4$ and $R_5$ is an alkoxyalkyl radical, especially an alkoxyalkyl radical having 3 to 6 carbon atoms in total.

$X^-$ is a monovalent anion as defined for $X^-$ in formula (II).

Preferred among the trimethineindolenine cyanine dyes of formula (III) are those dyes of formulae (IIIa) and (IIIb) shown below.

The dyes of formula (IIIa) are commensurate with 630 to 640 nm and the dyes of formula (IIIb) are commensurate with from more than 640 to 680 nm.

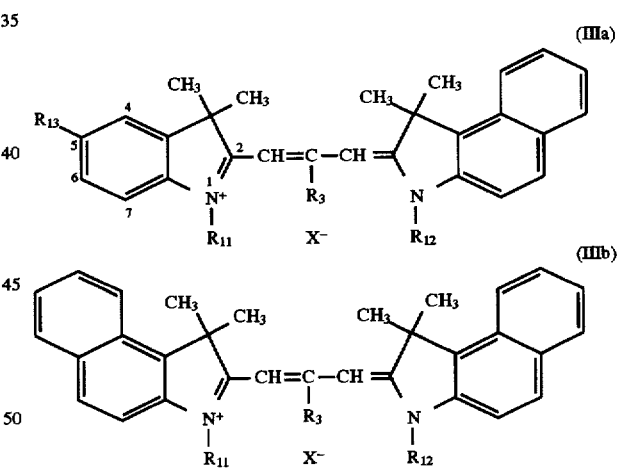

In formulae (IIIa) and (IIIb), $R_{11}$ and $R_{12}$ are as defined for $R_4$ and $R_5$ in formula (III), respectively; $R_3$ is as defined for $R_3$ in formula (III), preferably a hydrogen atom; and $X^-$ is as defined for $X^-$ in formula (III). In formula (IIIa), $R_{13}$ is a hydrogen atom, halogen atom or alkyl radical, preferably alkyl radical having 1 to 4 carbon atoms.

It is noted that in formulae (IIIa) and (IIIb), the indolenine and benzoindolenine rings may further have a substituent such as a halogen atom, alkyl, aryl, acyl and amino radical in addition to the above-mentioned $R_{13}$.

Also in formulae (IIIa) and (IIIb), $R_{11}$ and $R_{12}$ are preferably unsubstituted alkyl and alkoxyalkyl radicals. From the standpoint of increasing solubility in coating solvents to form coatings of better quality, it is preferred that either one or both of $R_{11}$ and $R_{12}$ are alkoxyalkyl radicals.

Examples of the alkoxyalkyl radical are methoxymethyl, methoxyethyl and ethoxyethyl radicals as exemplified in conjunction with formula (III). The alkoxyalkyl radical should preferably have 3 to 6 carbon atoms in total.
Illustrative examples of the trimethinecyanine dyes used herein are given below although the invention is not limited thereto.
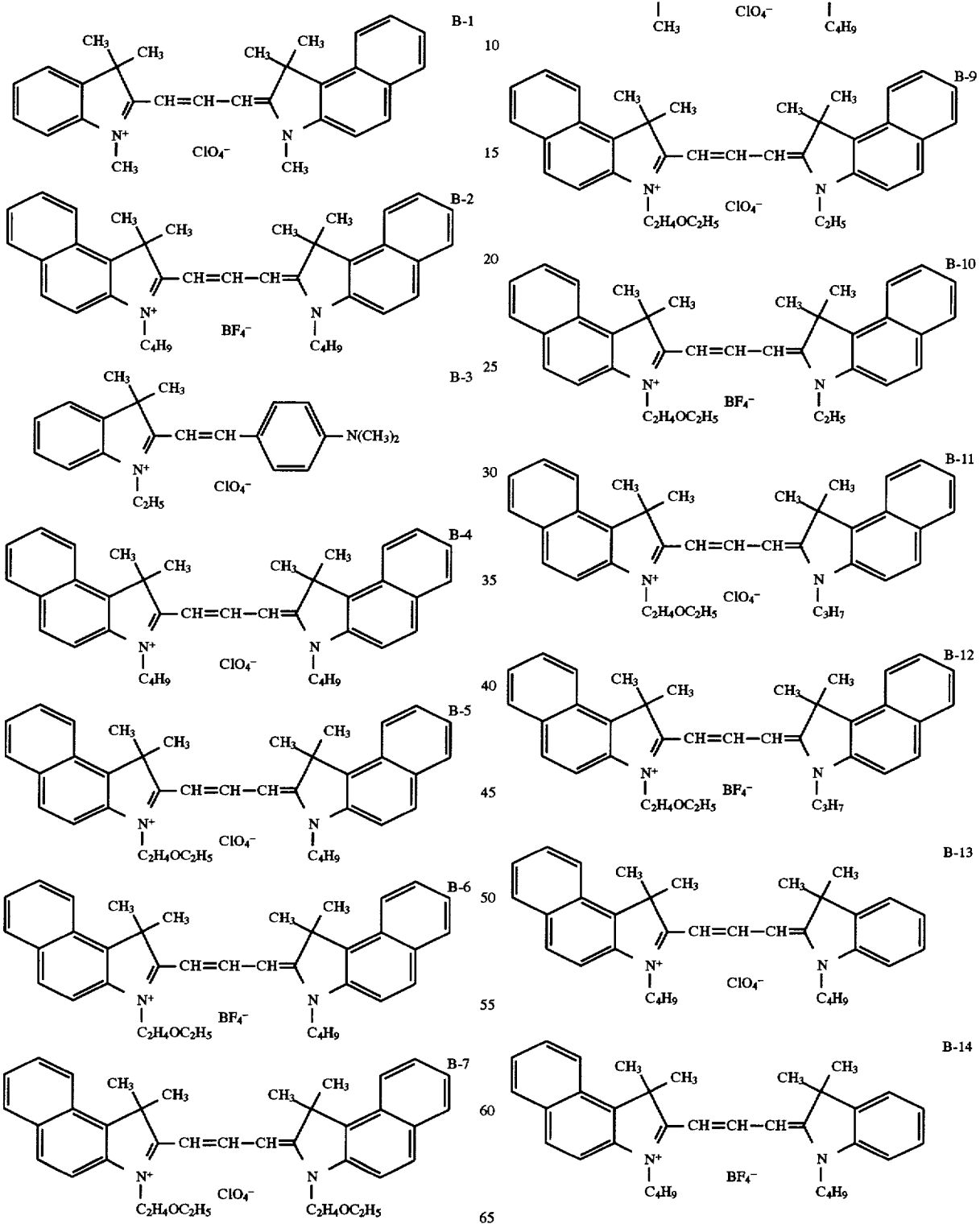

-continued
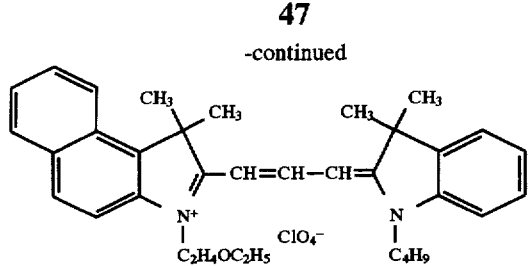
B-15
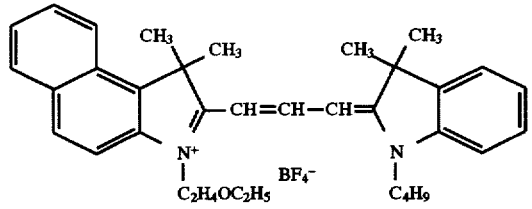
B-16
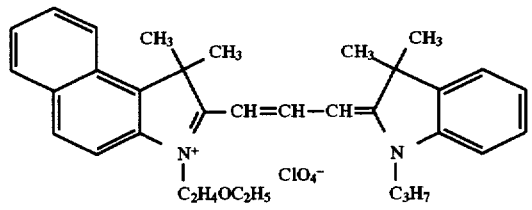
B-17
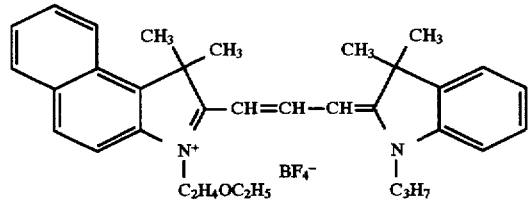
B-18
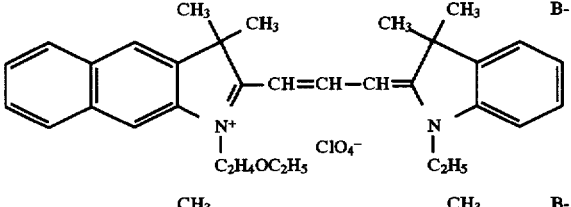
B-19
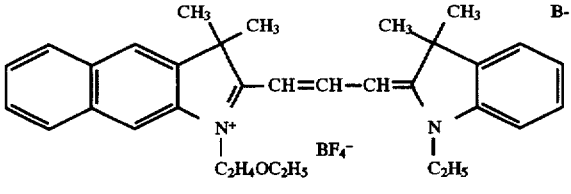
B-20
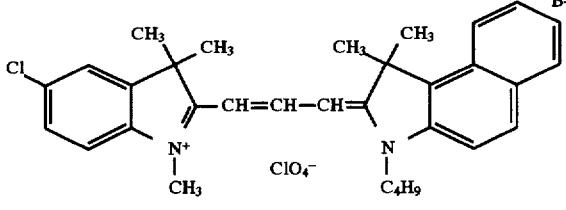
B-21
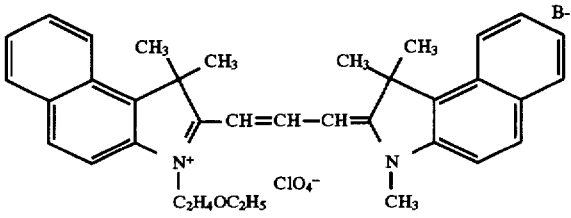
B-22
-continued
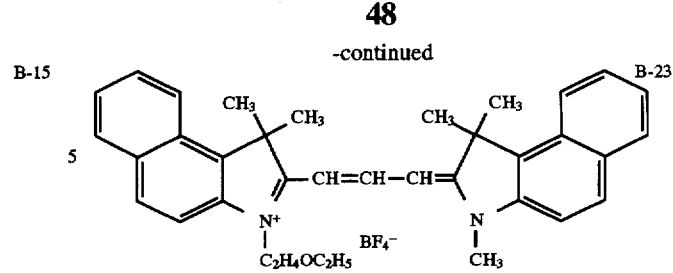
B-23
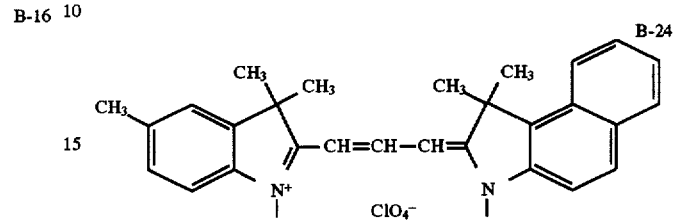
B-24
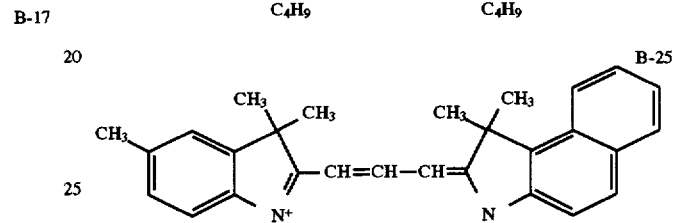
B-25
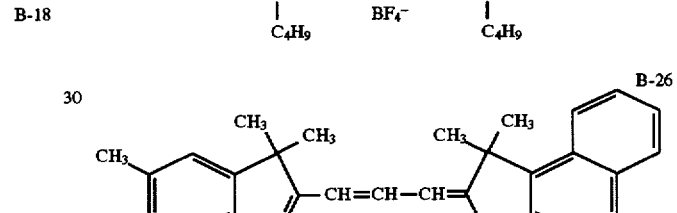
B-26
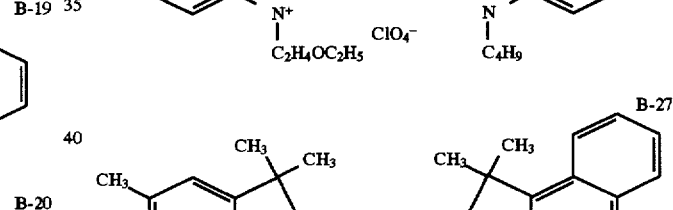
B-27
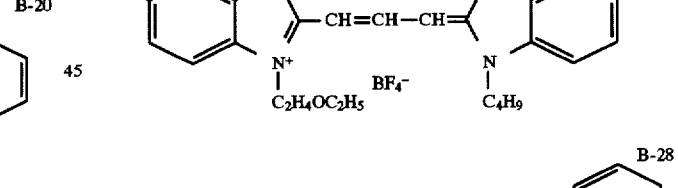
B-28
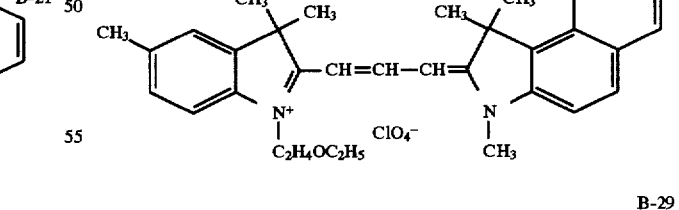
B-29

-continued

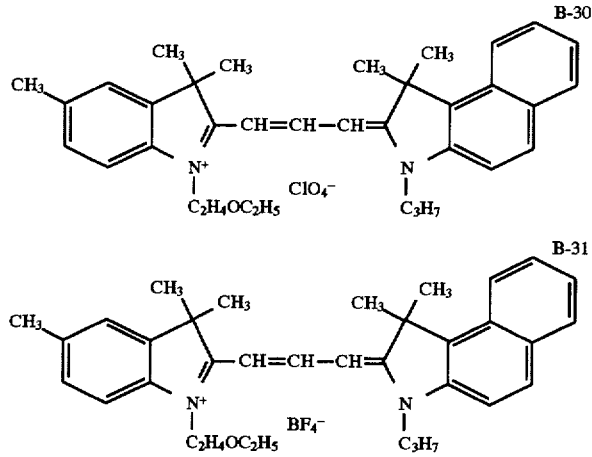

These trimethinecyanine dyes may be used alone or in admixture of two or more. The trimethinecyanine dyes have λmax in the range of 560 to 620 nm as measured on a dye thin film of 80 nm thick and a melting point (mp) in the range of 100° to 300° C.

For these trimethinecyanine dyes, λmax and n and k as measured at 630 nm or 650 nm on a dye film of 80 nm thick are shown in Tables 3 and 4.

TABLE 3

| Dye No. | n | k | (measuring wavelength, nm) | λmax (nm) |
|---|---|---|---|---|
| B-1 | 2.3 | 0.03 | (630) | 570 |
| B-2 | 2.5 | 0.08 | (650) | 610 |
| B-3 | 2.3 | 0.05 | (630) | 575 |
| B-4 | 2.5 | 0.09 | (650) | 612 |
| B-5 | 2.45 | 0.09 | (650) | 611 |
| B-6 | 2.45 | 0.08 | (650) | 614 |
| B-7 | 2.40 | 0.09 | (650) | 612 |
| B-8 | 2.45 | 0.09 | (630) | 582 |
| B-9 | 2.40 | 0.12 | (650) | 613 |
| B-10 | 2.35 | 0.10 | (650) | 612 |
| B-11 | 2.40 | 0.11 | (650) | 611 |
| B-12 | 2.40 | 0.10 | (650) | 612 |
| B-13 | 2.30 | 0.02 | (630) | 571 |
| B-14 | 2.35 | 0.03 | (630) | 572 |
| B-15 | 2.30 | 0.02 | (630) | 570 |

TABLE 4

| Dye No. | n | k | (measuring wavelength, nm) | λmax (nm) |
|---|---|---|---|---|
| B-16 | 2.30 | 0.02 | (630) | 571 |
| B-17 | 2.35 | 0.03 | (630) | 573 |
| B-18 | 2.30 | 0.04 | (630) | 573 |
| B-19 | 2.20 | 0.02 | (630) | 568 |
| B-20 | 2.20 | 0.02 | (630) | 569 |
| B-21 | 2.35 | 0.07 | (630) | 580 |
| B-22 | 2.50 | 0.04 | (650) | 598 |
| B-23 | 2.50 | 0.04 | (650) | 598 |
| B-24 | 2.45 | 0.04 | (630) | 598 |
| B-25 | 2.45 | 0.04 | (630) | 598 |
| B-26 | 2.45 | 0.04 | (630) | 598 |
| B-27 | 2.45 | 0.04 | (630) | 598 |
| B-28 | 2.45 | 0.04 | (630) | 598 |
| B-29 | 2.45 | 0.04 | (630) | 599 |
| B-30 | 2.45 | 0.04 | (630) | 599 |
| B-31 | 2.45 | 0.04 | (630) | 598 |

In the practice of the invention, a metal complex quencher which is a singlet oxygen quencher is preferably used as a stabilizer along with the trimethinecyanine dye in order to improve the light resistance of the trimethinecyanine dye. Such a metal complex quencher may be selected from the compounds described in JP-A 59795/1984, 48/1985, and 118749/1985.

Examples of the metal complex quencher include those of acetylacetonato systems, bisdithiol systems such as bisdithio-α-diketone and bisphenyldithiol systems, thiocatechol systems, salicylaldehydeoxime systems, and thiobisphenolate systems. Preferred among others are metal complex quenchers of the bisphenyldithiol system. The center metal is, for example, Ni, Cu, Co, Pd, and Pt, with Ni and Cu, especially Cu being preferred.

The amount of the metal complex quencher used may be suitably determined in accordance with a particular dye used.

Also the metal complex quencher may be used in a bonded form wherein the metal complex quencher anion forms the counter anion to the trimethinecyanine dye cation, that is, $X^-$ in formula (II). Preferred in this case are anions of the same metal complex quenchers as above, especially anions of bisphenyldithiol system metal complex quenchers. Preferred center metals are as described above. The bonded form may be obtained by salt exchange.

Further in the practice of the invention, it is especially preferred to use a metal-containing azo compound of formula (IV) as the metal complex quencher. Since the metal-containing azo compound exhibits substantially the same absorption as the trimethinecyanine dye, it is effective for improving the light resistance of the dye without changing the reflectance of the dye itself.

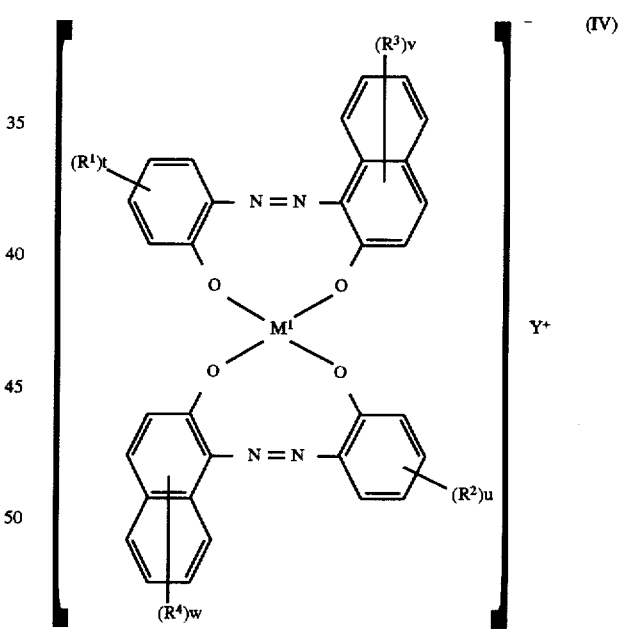

Formula (IV) is described. In formula (IV), each of $R^1$ and $R^2$ is a nitro radical, halogen atom, amino radical, sulfamoyl radical, alkyl radical or alkoxy radical.

The halogen atom represented by $R^1$ and $R^2$ includes F, Cl, Br, and I.

The amino radical represented by $R^1$ and $R^2$ may have a substituent such as an alkyl, alkoxy and acyl radical, which substituent may, in turn, have a substituent such as a halogen atom (Cl, Br, I, etc.), hydroxyl radical and alkoxy radical. Examples of the amino radical represented by $R^1$ and $R^2$ are amino, methylamino, dimethylamino, acetylamino, and benzylamino radicals. The total number of carbon atoms in such an amino radical should preferably be 0 to 8.

The sulfamoyl radical represented by $R^1$ and $R^2$ may have a substituent such as an alkyl and alkoxy radical, which substituent may, in turn, have a substituent such as a halogen atom (Cl, Br, I, etc.), hydroxyl radical and alkoxy radical. Examples of the sulfamoyl radical represented by $R^1$ and $R^2$ are sulfamoyl, N-methylsulfamoyl, N,N-dimethylsufamoyl, N,N-diethylsulfamoyl, N,N-methylhydroxyethylsulfamoyl, N,N-methoxyethylsulfamoyl, and N-methoxyethylsulfamoyl radicals. The total number of carbon atoms in such a sulfamoyl radical should preferably be 0 to 10.

The alkyl radical represented by $R^1$ and $R^2$ preferably has 1 to 4 carbon atoms, may be either normal or branched, and may have a substituent (e.g., halogen atom and alkoxy radical). Examples of the alkyl radical include methyl, ethyl, n-propyl, isopropyl, n-butyl, isobutyl, s-butyl, t-butyl, and methoxyethyl radicals.

The alkoxy radical represented by $R^1$ and $R^2$ is preferably one in which the alkyl moiety has 1 to 4 carbon atoms, and may have a substituent. Exemplary are methoxy and ethoxy radicals.

In formula (IV), each of $R^3$ and $R^4$ is a halogen atom, nitro radical, alkyl radical, alkoxy radical or amino radical.

The halogen atom, alkyl radical, alkoxy radical and amino radical represented by $R^3$ and $R^4$ are as defined for $R^1$ and $R^2$.

Each of t and u is 0 or an integer of 1 to 4, each of v and w is 0 or an integer of 1 to 6, they are not equal to 0 at the same time, and the sum of t+u+v+w is 1 to 20. Where t, u, v or w is an integer of 2 or more, the $R^1$ radicals, $R^2$ radicals, $R^3$ radicals or $R^4$ radicals may be the same or different. Under these conditions, each of t and u is preferably 0, 1 or 2, and each of v and w is preferably 0 or 1. It is also preferred that t=u and v=w. It is preferred that whether or not two benzene rings or two naphthalene rings have a substituent, and if present, the type, position and number of substituents are the same between the two rings.

It is noted that the present invention should preferably avoid a combination of substituents in formula (IV) wherein t and u are integers of at least 1, electron attractive radicals such as nitro radicals are present as $R^1$ and $R^2$, V and w are integers of at least 1, and electron donative radicals such as amino radicals are present as $R^3$ and $R^4$. The present invention should also preferably avoid an inverse combination of substituents in formula (IV) wherein electron donative radicals such as amino radicals are present as $R^1$ and $R^2$ and electron attractive radicals such as nitro radicals are present as $R^3$ and $R^4$.

In formula (IV), $M^1$ is Co or Ni, with Co being especially preferred.

In formula (IV), $Y^+$ is an alkyl-substituted ammonium ion. The alkyl moiety of the alkyl-substituted ammonium ion may be either normal or branched and may have a substituent (e.g., ether, acyloxy and aryl radicals). Especially an ammonium ion having an alkyl radical with an intervening ether bond (—O—) is preferred. The total number of carbon atoms in the alkyl-substituted ammonium ion is preferably 4 to 21.

Illustrative examples of the alkyl-substituted ammonium ion represented by $Y^+$ are given below.

$Y^+$-1  $CH_3O(CH_2)_3NH_3^+$
$Y^+$-2  $C_6H_5—CH_2O—(CH_2)_2NH(CH_3)_2^+$
$Y^+$-3  $CH_3—O—CH_2CH_2—O—(CH_2)_2NH(i-C_3H_7)_2^+$
$Y^+$-4  $i-C_3H_7O—(CH_2)_3NH_3^+$
$Y^+$-5  $C_4H_9O—(CH_2)_3NH_2(—CH_2C_6H_5)^+$
$Y^+$-6  $t-C_4H_9O—(CH_2)_3NH_2(i-C_3H_7)^+$
$Y^+$-7  $(CH_3O)_2CHCH_2NH_2(CH_3)^+$
$Y^+$-8  $C_6H_{13}O—(CH_2)_3NH_3^+$
$Y^+$-9  $CH_3(CH_2)_3CH(C_2H_5)CH_2O(CH_2)_3NH_3^+$
$Y^+$-10 $C_5H_{11}O—(CH_2)_2CH(NH_3)CH_3^+$
$Y^+$-11 $i-C_3H_7O—(CH_2)_2NH_3^+$
$Y^+$-12 $C_2H_5O—(CH_2)_3NH(OCH_3)(C_2H_5)^+$
$Y^+$-13 $C_2H_5O—C_2H_4O—(CH_2)_3NH_3^+$
$Y^+$-14 $i-C_5H_{11}O—(CH_2)_3NH_3^+$
$Y^+$-15 $i-C_{13}H_{27}NH_3^+$
$Y^+$-16 $CH_3(CH_2)_2(C_2H_5)(CH_2)_2O(CH_2)_3NH_3^+$
$Y^+$-17 $(C_2H_5)_2CH—(CH_2)_3O(CH_2)_3NH_3^+$
$Y^+$-18 $CH_3CH(C_2H_5)(CH_2)_4O(CH_2)_3\ NH_3^+$
$Y^+$-19 $CH_3(CH_2)_3CH(C_2H_5)(CH_2)_2O(CH_2)_2\ NH_3^+$

Illustrative examples of the metal-containing azo compound of formula (IV) which can be used herein are given below although the invention is not limited thereto. Examples are shown below by combinations of substituents in formula (IVa) wherein $Y^+$ is expressed by $Y^+$-1 etc. exemplified just above. Where all of $R^{11}$ to $R^{14}$ etc. are hydrogen, it is shown by "H." Where any of $R^{11}$ to $R^{14}$ has a substituent, only the substituted one is shown, with the expression "H" being omitted.

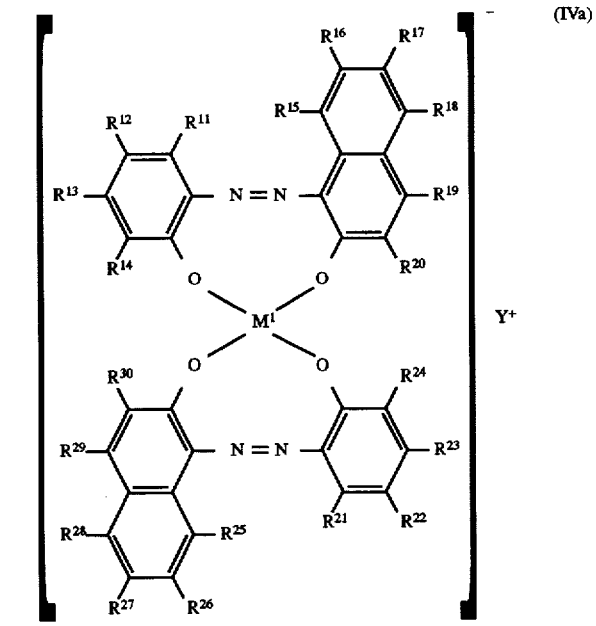

(IVa)

| Compound No. | $R^{11}$-$R^{14}$ | $R^{15}$-$R^{20}$ | $R^{21}$-$R^{24}$ | $R^{25}$-$R^{30}$ | $M^1$ | $Y^+$ |
|---|---|---|---|---|---|---|
| I-1 | $R^{12}$ = —$SO_2NH_2$ | H | $R^{22}$ = —$SO_2NH_2$ | H | Co | $Y^+$-9 |
| I-2 | $R^{12}$ = —$SO_2NH_2$ | $R^{19}$ = $CH_3$ | $R^{22}$ = —$SO_2NH_2$ | $R^{20}$ = $CH_3$ | Co | $Y^+$-9 |
| I-3 | $R^{12}$ = $NO_2$ | H | $R^{22}$ = $NO_2$ | H | Co | $Y^+$-9 |
| I-4 | $R^{12}$ = Cl | H | $R^{22}$ = Cl | H | Co | $Y^+$-9 |
|  | $R^{13}$ = $CH_3$ |  | $R^{23}$ = $CH_3$ |  |  |  |

-continued

| Compound No. | $R^{11}$–$R^{14}$ | $R^{15}$–$R^{20}$ | $R^{21}$–$R^{24}$ | $R^{25}$–$R^{30}$ | $M^1$ | $Y^+$ |
|---|---|---|---|---|---|---|
| I-5 | $R^{12}$ = Cl<br>$R^{13}$ = OCH$_3$ | H | $R^{22}$ = Cl<br>$R^{23}$ = OCH$_3$ | H | Co | Y$^+$-9 |
| I-6 | $R^{12}$ = —SO$_2$NH$_2$ | H | $R^{22}$ = —SO$_2$NH$_2$ | H | Co | Y$^+$-1 |
| I-7 | $R^{12}$ = —SO$_2$NH$_2$ | H | $R^{22}$ = —SO$_2$NH$_2$ | H | Co | Y$^+$-2 |
| I-8 | $R^{12}$ = —SO$_2$NH$_2$ | H | $R^{22}$ = —SO$_2$NH$_2$ | H | Co | Y$^+$-3 |
| I-9 | $R^{12}$ = —SO$_2$NH$_2$ | H | $R^{22}$ = —SO$_2$NH$_2$ | H | Co | Y$^+$-4 |
| I-10 | $R^{12}$ = —SO$_2$NH$_2$ | H | $R^{22}$ = —SO$_2$NH$_2$ | H | Co | Y$^+$-5 |
| I-11 | $R^{12}$ = —SO$_2$NH$_2$ | H | $R^{22}$ = —SO$_2$NH$_2$ | H | Co | Y$^+$-6 |
| I-12 | $R^{12}$ = —SO$_2$NH$_2$ | H | $R^{22}$ = —SO$_2$NH$_2$ | H | Co | Y$^+$-7 |
| I-13 | $R^{12}$ = —SO$_2$NH$_2$ | H | $R^{22}$ = —SO$_2$NH$_2$ | H | Co | Y$^+$-8 |
| I-14 | $R^{12}$ = —SO$_2$NH$_2$ | H | $R^{22}$ = —SO$_2$NH$_2$ | H | Co | Y$^+$-10 |
| I-15 | $R^{12}$ = —SO$_2$NH$_2$ | H | $R^{22}$ = —SO$_2$NH$_2$ | H | Co | Y$^+$-11 |
| I-16 | $R^{12}$ = —SO$_2$NH$_2$ | H | $R^{22}$ = —SO$_2$NH$_2$ | H | Co | Y$^+$-12 |
| I-17 | $R^{12}$ = —SO$_2$NH$_2$ | H | $R^{22}$ = —SO$_2$NH$_2$ | H | Co | Y$^+$-13 |
| I-18 | $R^{12}$ = —SO$_2$NH$_2$ | H | $R^{22}$ = —SO$_2$NH$_2$ | H | Co | Y$^+$-14 |
| I-19 | $R^{12}$ = —SO$_2$NH$_2$ | H | $R^{22}$ = —SO$_2$NH$_2$ | H | Co | Y$^+$-15 |
| I-20 | $R^{12}$ = —SO$_2$NH$_2$ | H | $R^{22}$ = —SO$_2$NH$_2$ | H | Co | Y$^+$-16 |
| I-21 | $R^{12}$ = —SO$_2$NH$_2$ | H | $R^{22}$ = —SO$_2$NH$_2$ | H | Co | Y$^+$-17 |
| I-22 | $R^{12}$ = —SO$_2$NH$_2$ | H | $R^{22}$ = —SO$_2$NH$_2$ | H | Co | Y$^+$-18 |
| I-23 | $R^{12}$ = —SO$_2$NH$_2$ | H | $R^{22}$ = —SO$_2$NH$_2$ | H | Co | Y$^+$-19 |
| I-24 | $R^{12}$ = —SO$_2$NH$_2$ | H | $R^{22}$ = —SO$_2$NH$_2$ | H | Ni | Y$^+$-9 |
| I-25 | $R^{12}$ = —SO$_2$NH$_2$ | H | $R^{22}$ = —SO$_2$NH$_2$ | H | Ni | Y$^+$-15 |
| I-26 | $R^{12}$ = —SO$_2$NH<br>—C$_2$H$_4$—OCH$_3$ | H | $R^{22}$ = —SO$_2$NH<br>—C$_2$H$_4$—OCH$_3$ | H | Co | Y$^+$-9 |
| I-27 | $R^{12}$ = —SO$_2$N(CH$_3$)$_2$ | H | $R^{22}$ = —SO$_2$N(CH$_3$)$_2$ | H | Co | Y$^+$-9 |
| I-28 | $R^{13}$ = —N(C$_2$H$_5$)$_2$ | H | $R^{23}$ = —N(C$_2$H$_5$)$_2$ | H | Co | Y$^+$-10 |
| I-29 | H | $R^{19}$ = —N(C$_2$H$_5$)$_2$ | H | $R^{29}$ = —N(C$_2$H$_5$)$_2$ | Co | Y$^+$-11 |
| I-30 | H | $R^{19}$ = —N(C$_2$H$_5$)$_2$ | H | $R^{29}$ = —N(C$_2$H$_5$)$_2$ | Co | Y$^+$-9 |
| I-31 | H | $R^{16}$ = NO$_2$ | H | $R^{26}$ = NO$_2$ | Co | Y$^+$-10 |
| I-32 | H | $R^{18}$ = NO$_2$ | H | $R^{28}$ = NO$_2$ | Co | Y$^+$-11 |
| I-33 | $R^{12}$ = t-C$_4$H$_9$ | $R^{19}$ = Cl | $R^{22}$ = t-C$_4$H$_9$ | $R^{29}$ = Cl | Co | Y$^+$-9 |
| I-34 | H | $R^{19}$ = —OCH$_3$ | H | $R^{29}$ = —OCH$_3$ | Co | Y$^+$-9 |

These metal-containing azo compounds can be synthesized in accordance with well-known publications, for example, JP-A 39328/1975, JP-A 151061/1980 (corresponding to West German Patent OS 29 18 634), West German Patent Nos. 12 60 652 and 12 26 727.

The metal-containing azo compounds of formula (IV) have a melting point (mp) of 100° to 300° C. and λmax in the range of 500 to 650 nm as measured on a dye thin film of 50 nm thick.

These compounds have a complex index of refraction as measured at 650 nm by the same procedure as previously described, whose real part n is 1.8 to 2.6 and whose imaginary part k is 0 to 0.30. The metal-containing azo compounds used herein are well soluble, especially in polar solvents. For example, 0.5 to 10% by weight of metal-containing azo compounds are soluble in alcohols, cellosolves, alkoxyalcohols, keto-alcohols such as diacetone alcohol, ketones such as cyclohexanone, and fluorinated alcohols such as 2,2,3,3-tetrafluoropropanol. Since more than 4% by weight of metal-containing azo compounds are soluble in ethyl cellosolve and 2,2,3,3-tetrafluoropropanol which are appropriate coating solvents particularly in coating on polycarbonate disc substrates, films of quality can be briefly formed by spin coating.

The metal-containing azo compounds may be used alone or in admixture of two or more. With respect to mixing with the trimethinecyanine dye, the molar ratio of metal-containing azo compound to trimethinecyanine dye is preferably from 10/90 to 95/5.

The recording layer using dyes A and B is especially preferred for use in write-once type optical recording discs (CD-R). The recording layer is preferably formed using a coating solution containing dyes. Especially preferred is a spin coating technique of applying and spreading a coating solution onto a rotating substrate.

Herein, the coating solvent used may be selected from alcohol solvents (including keto-alcohols and alkoxyalcohols such as ethylene glycol monoalkyl ethers), aliphatic hydrocarbon solvents, ketone solvents, ester solvents, ether solvents, aromatic solvents, halogenated alkyl solvents, etc.

Preferred among these are alcohol and aliphatic hydrocarbon solvents. Preferable alcohol solvents are alkoxyalcohols and keto-alcohols. In the preferred alkoxyalcohols, the alkoxy moiety has 1 to 4 carbon atoms, the alcohol moiety has 1 to 5 carbon atoms, especially 2 to 5, and the total number of carbon atoms is 3 to 7. Examples include ethylene glycol monomethyl ether (methyl cellosolve), ethylene glycol monoethyl ether (ethyl cellosolve also known as ethoxyethanol), butyl cellosolve, ethylene glycol monoalkyl ethers (cellosolves) such as 2-isopropoxy-1-ethanol, 1-methoxy-2-propanol, 1-methoxy-2butanol, 3-methoxy-1-butanol, 4-methoxy-1-butanol, and 1-ethoxy-2-propanol. An exemplary keto-alcohol is diacetone alcohol. Fluorinated alcohols such as 2,2,3,3-tetrafluoropropanol are also useful.

Preferred for the aliphatic hydrocarbon solvents are n-hexane, cyclohexane, methylcyclohexane, ethylcyclohexane, cyclooctane, dimethylcyclohexane, n-octane, iso-propylcyclohexane and t-butylcyclohexane, among which ethylcyclohexane and dimethylcyclohexane are most preferable.

Cyclohexanone is typical of the ketone solvent.

In the practice of the invention, alkoxyalcohols such as ethylene glycol monoalkyl ethers are preferred. Preferred among these are ethylene glycol monoethyl ether, 1-methoxy-2-propanol, 1-methoxy-2-butanol, etc. Also preferred is a mixture of these solvents, for example, a combination of ethylene glycol monoethyl ether and 1-methoxy-2-butanol.

After spin coating as mentioned above has been completed, the film is dried, if required. The thus formed recording layer has usually a thickness of about 500 to about 3,000 Å, preferably about 1,000 to about 3,000 Å although it may be appropriately determined depending on the desired reflectance etc.

It is understood that the dye content of the coating solution is preferably 2 to 10% by weight. The coating solution may optionally contain binders, dispersants, etc. in addition to the above-mentioned stabilizers.

Figure 2:
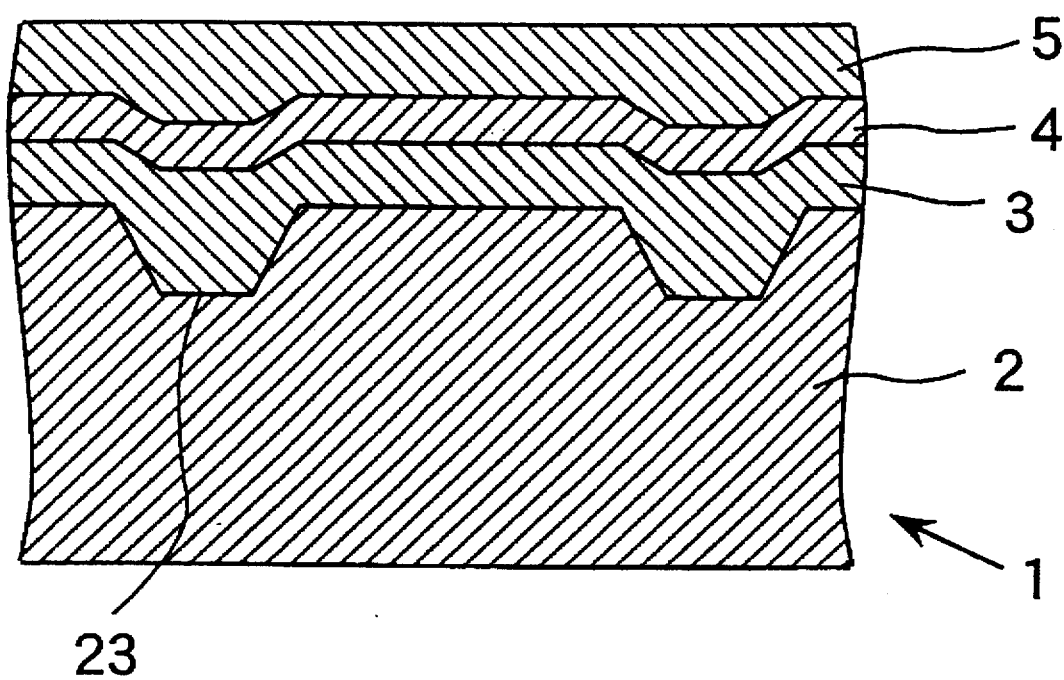
FIG. 2 is a fragmental cross-sectional view of an optical recording disc according to one embodiment of the invention.

One embodiment of the optical recording disc having such a dye film on a substrate as a recording layer is schematically illustrated in FIG. 2. FIG. 2 is a sectional view of part of that embodiment. The optical recording disc 1 shown in FIG. 2 is a close contact type optical recording disc which has a recording layer and a reflective layer disposed in close contact therewith and enables reading according to the CD standard. As illustrated, the optical recording disc 1 includes a recording layer 3 composed mainly of such dyes as mentioned above, which is formed on the surface of a substrate 2, a reflective layer 4 in close contact with the recording layer 3, and a protective layer 5.

The substrate 2 is in a disc form and, to enable write and read from the back surface of the substrate, is preferably formed of a resin or glass material which is substantially transparent to writing and reading light (typically laser light having a wavelength of about 580 nm to about 900 nm, especially about 580 nm to about 680 nm and semiconductor laser light having a wavelength of about 770 nm to about 900 nm, especially 635 nm, 650 nm and 780 nm) or in another parlance, has a transmittance of at least 88%. With respect to dimensions, the disc has a diameter of about 64 mm to about 200 mm and a thickness of about 1.2 mm.

On the surface of the substrate 2 where the recording layer 3 is formed, a groove 23 is formed for tracking purposes, as shown in FIG. 2. The groove 23 is preferably a continuous spiral groove having a depth of 0.1 to 0.25 μm, a width of 0.35 to 0.50 μm and a groove pitch of 1 to 1.7 μm. Such groove configuration enables good-enough tracking signals to be obtained without a lowering of the reflection level of the groove area. It is particularly important to limit groove width to 0.35 to 0.50 μm. A groove width of less than 0.35 μnm makes it difficult to obtain tracking signals of sufficient magnitude, resulting in an increased jitter even when tracking is slightly offset during recording. A groove width of more than 0.50 μm has a likelihood that read signals are subject to waveform distortion, causing an increased crosstalk.

The substrate 2 is preferably formed of resins, typically thermoplastic resins such as polycarbonate resins, acrylic resins, amorphous polyolefins, TPX and polystyrene resins. Using these resins, the substrate can be prepared by well-known techniques such as injection molding. Preferably, the groove 23 should be formed simultaneously with the molding of the substrate 2. Alternatively, a resin layer having the groove 23 may be formed by 2P or other methods after the fabrication of the substrate 2. Also, a glass substrate is useful as the case may be.

As shown in FIG. 2, the recording layer 3 deposited on the substrate 2 is formed using the above-mentioned dye-containing coating solution, preferably by spin coating as mentioned previously. Spin coating may be carried out from the inner to the outer periphery under conventional conditions while the number of revolutions is adjusted between 500 rpm and 5,000 rpm.

Preferably, the thus formed recording layer 3 has an as-dried thickness of 500 to 3,000 Å (50 to 300 nm). A departure from this range gives rise to a reflectance drop, rendering it difficult to read according to the CD standard. A very high degree of modulation is obtained when the thickness of the tracking area of the recording layer 3 within the groove 23 is kept at 1,000 Å (100 nm) or more, especially, at 1,300 to 3,000 Å (130 to 300 nm).

As shown in FIG. 2, the reflective layer 4 is formed on the recording layer 3 in direct contact relation thereto. Preferably, the reflective layer 4 is formed of a high-reflectance metal or alloy such as Au, Cu, Al and CuAg. The reflective layer 4 preferably has a thickness of at least 500 Å, and may be formed as by evaporation and sputtering. The upper limit of thickness is not critical, although it is preferably about 1,200 Å or less when cost, production time and other factors are taken into account. Then the reflective layer itself has a reflectance of at least 90%, and the reflectance of an unrecorded area of the medium through the substrate can be at least 60%, especially at least 70% at a wavelength of about 780 nm.

As shown in FIG. 2, the protective layer 5 is formed on the reflective layer 4. The protective layer 5 is formed of various resin materials such as UV curable resins, for instance, and usually has a thickness of about 0.5 μm to about 100 μm. The protective layer 5 may be in a layer or sheet form. The protective layer 5 may be formed by conventional processes such as spin coating, gravure coating, spray coating and dipping.

Recording or additional writing may be carried out on the optical recording disc 1 of such construction by directing recording light having a wavelength of 780 nm or 635 nm or 650 nm, for example, in pulse form to the recording layer 3 through the substrate 2 to form an irradiated spot where optical reflectance is changed. Upon irradiation of recording light, the recording layer 3 absorbs light so that it is heated while the substrate 2 is heated at the same time. As a result, the materials of the recording layer such as the dyes melt or decompose in the vicinity of the interface between the substrate 2 and the recording layer 3, probably applying pressure to that interface to deform the bottom and side walls of the groove. On recording, the substrate is rotated at a linear velocity of about 1.2 m/s to about 1.4 m/s.

This invention is applicable not only to close contact type optical recording media such as the illustrated one, but also to any optical recording medium having a dye-containing recording layer. Typical of such a medium is a pit formation type optical recording disc of the air sandwich structure. Similar benefits can be accomplished by applying this invention to such discs.

EXAMPLE

This invention will now be explained in more detail with reference to specific examples of the invention and comparative examples.

Example 1

Polycarbonate was injection molded to obtain a substrate of 120 mm in diameter and 1.2 mm in thickness. On the surface of the substrate on which a recording layer was to be formed, there was provided a tracking groove having a groove pitch of 1.6 μm, a groove width of 0.42 μm and a groove depth of 1,550 Å.

Next, a mixture of dyes A-1 and B-1 in a weight ratio of 1:1 was dissolved in ethyl cellosolve, obtaining a dye coating solution having a dye content of 4% by weight. By spin coating this solution, a dye film was formed as a recording layer. The thickness (as-dried thickness) of the recording layer was 1,500 Å in the groove and 1,200 Å on the average. Further, an Au reflective layer of 85 nm thick was formed on the recording layer by sputtering, and a protective layer (5 μm thick) of a UV-curing type acrylic resin was formed thereon. In this way, an optical recording disc as shown in FIG. 2 was obtained.

This disc sample No. 1 was examined for write/read characteristics at a linear velocity of 1.4 m/s by means of a 780-nm semiconductor laser, finding an optimum recording power of 7.3 mW, a reflectance of the unrecorded disc of more than 70%, a degree of modulation of record signals of more than 60%, and a reflectance of record signals (Rtop) of 65%. Therefore, this disc was found to be an optical recording disc conforming to the Orange Book standard.

The disc which had been recorded at 780 nm was examined for read characteristics at a linear velocity of 1.4 m/s by means of a 635-nm semiconductor laser, finding a reflectance of 52% and a degree of modulation of 44%. An error rate of less than 10 errors/sec. was found when measurement was done in accordance with the C1 error of the Orange Book standard. This suggests that the disc which has been recorded at 780 nm can be satisfactorily read at 635 nm.

Inversely, the disc sample was examined for write/read characteristics at a linear velocity of 1.4 m/s by means of a 635-nm semiconductor laser, finding an optimum recording power of 5 mW, a reflectance of the unrecorded disc of 55%, a degree of modulation of record signals of 45%, and an Rtop of 53%. It was thus found that this disc was capable of satisfactory writing and reading at 635 nm.

The disc which had been recorded at 635 nm was examined for read characteristics at a linear velocity of 1.4 m/s by means of a 780-nm semiconductor laser, finding an Rtop of 66% and a degree of modulation of 70%. An error rate of less than 10 errors/sec. was found when the C1 error was measured. It was found that the disc was capable of satisfactory reading meeting the Orange Book standard.

It is noted that dye A-1 had n=2.2 and k=0.08 at 780 nm and the absorption spectrum of its thin film had a λmax of 724 nm and a half-value width of 130 nm as previously reported. Dye B-1 had n=2.3 and k=0.03 at 630 nm (as measured on a dye film of 80 nm thick) and a λmax of 570 nm.

Example 2

A disc was prepared and evaluated as in Example 1 except that dyes A-2 and B-2 (in a weight ratio 7:3) were used. The thickness (as-dried thickness) of the recording layer was 1,300 Å in the groove and 1,000 Å on the average.

This disc sample was examined for write/read characteristics at a linear velocity of 1.2 m/s by means of a 780-nm semiconductor laser, finding an optimum recording power of 6.9 mW, a reflectance of more than 70%, a degree of modulation of more than 60%, and an Rtop of 65%. Therefore, this disc was found to be an optical recording disc conforming to the Orange Book standard.

The disc was further examined for read characteristics at a linear velocity of 1.2 m/s by means of a 650-nm semiconductor laser, finding a reflectance of 45% and a degree of modulation of 40%. The error rate was found equivalent to that of Example 1. This suggests that the disc which has been recorded at 780 nm can be satisfactorily read at 650 nm.

Inversely, the disc sample was examined for write/read characteristics at a linear velocity of 1.2 m/s by means of a 650-nm semiconductor laser, finding an optimum recording power of 5.3 mW, a reflectance of the unrecorded disc of 47%, a degree of modulation of record signals of 40%, and an Rtop of 45%. It was thus found that this disc was capable of satisfactory writing and reading at 650 nm.

The disc which had been recorded at 650 nm was examined for read characteristics at a linear velocity of 1.2 m/s by means of a 780-nm semiconductor laser, finding an Rtop of 67% and a degree of modulation of 73%. An error rate of less than 10 errors/sec. was found when the C1 error was measured. It was found that the disc was capable of satisfactory reading meeting the Orange Book standard.

It is noted that dye A-2 had n=2.3 and k=0.05 at 780 nm and the absorption spectrum of its thin film had a λmax of 715 nm and a half-value width of 140 nm as previously reported. Dye B-2 had n=2.5 and k=0.08 at 650 nm (as measured on a dye film of 75 nm thick) and a λmax of 610 nm.

Example 3

A disc was prepared and evaluated as in Example 1 except that dyes A-3 and B-3 (in a weight ratio 3:7) were used. The thickness (as-dried thickness) of the recording layer was 1,500 Å in the groove and 1,300 Å on the average.

This disc sample was recorded at a linear velocity of 4.8 m/s and examined for read characteristics at a linear velocity of 1.2 m/s by means of a 780-nm semiconductor laser, finding an optimum recording power of 12 mW, a reflectance of more than 70%, a degree of modulation of more than 60%, and an Rtop of 65%. Therefore, this disc was found to be an optical recording disc conforming to the Orange Book standard.

The disc was further examined for read characteristics at a linear velocity of 1.2 m/s by means of a 635-nm semiconductor laser, finding a reflectance of 45% and a degree of modulation of 40%. The error rate was found equivalent to that of Example 1. This suggests that the disc which has been recorded at 780 nm can be satisfactorily read at 635 nm.

Inversely, the disc sample was examined for write/read characteristics at a linear velocity of 1.2 m/s by means of a 635-nm semiconductor laser, finding an optimum recording power of 5.5 mW, a reflectance of the unrecorded disc of 48%, a degree of modulation of record signals of 40%, and an Rtop of 45%. It was thus found that this disc was capable of satisfactory writing and reading at 635 nm.

The disc which had been recorded at 635 nm was examined for read characteristics at a linear velocity of 1.2 m/s by means of a 780-nm semiconductor laser, finding an Rtop of 65% and a degree of modulation of 63%. An error rate of less than 10 errors/sec. was found when the C1 error was measured. It was found that the disc was capable of satisfactory reading meeting the Orange Book standard.

It is noted that dye A-3 had n=2.4 and k=0.10 at 780 nm and the absorption spectrum of its thin film had a λmax of 725 nm and a half-value width of 125 nm as previously reported. Dye B-3 had n=2.3 and k=0.05 at 630 nm (as measured on a dye film of 80 nm thick) and a λmax of 575 nm.

Example 4

Disc samples were prepared and evaluated as in Example 1 except that dye A-4, A-5, A-7, A-8, A-9, A-13, A-27, A-28 or A-24 was used instead of dye A-1, with the results being equivalent to the sample of Example 1.

Example 5

Disc samples were prepared and evaluated as in Example 2 except that dyes A-19 or A-34 was used instead of dye A-2, with the results being equivalent to the sample of Example 2.

Example 6

Disc samples were prepared and evaluated as in Example 3 except that dye A-4, A-5, A-7, A-8, A-9, A-13, A-27, A-28 or A-24 was used instead of dye A-3, with the results being equivalent to the sample of Example 3.

Comparative Example 1

A disc was prepared and evaluated for characteristics as in Example 1 except that only dye A-1 was used. On evaluation at 780 nm, there were found an optimum recording power of 7 mW, a reflectance of 72%, a degree of modulation of 65%, and an Rtop of 67%. Therefore, this disc was found to be an optical recording disc conforming to the Orange Book standard.

Next, the disc was evaluated at 635 nm as in Example 1. Read characteristics were examined at a linear velocity of 1.4 m/s to find a reflectance of 20% and a degree of modulation of 10%, indicating that the disc which had been recorded at 780 nm could not be read at 635 nm.

On the other hand, no satisfactory signals were obtained from recording at 635 nm even when the recording power was 7 mW.

Comparative Example 2

A disc was prepared and evaluated for characteristics as in Example 1 except that only dye B-1 was used. Evaluation at 780 nm was impossible because no signals could be recorded even when a recording power of 12 mW was applied.

On the other hand, write/read characteristics at 635 nm were substantially equivalent to the disc sample of Example 1 although the disc which had been recorded at 635 nm could not be read at 780 nm.

Comparative Example 3

A disc was prepared and evaluated for characteristics as in Example 1 except that dye A-1 was replaced by pentamethinecyanine dye C-1 shown below. On evaluation at 780 nm, there were found an optimum recording power of 6 mW, a reflectance of 68%, a degree of modulation of 75%, and an Rtop of 68%. Therefore, this disc was found to be an optical recording disc conforming to the Orange Book standard.

Next, the disc was evaluated at 635 nm as in Example 1. Read characteristics were examined at a linear velocity of 1.4 m/s to find a reflectance of 13%, which means that no signals could be read.

On the other hand, write/read characteristics at 635 nm were examined at a linear velocity of 1.4 m/s to find unsatisfactory characteristics as demonstrated by a recording power of 4 mW, a reflectance of the unrecorded disc of 15%, a degree of modulation of record signals of 50%, and an Rtop of 13%.

It is noted that pentamethinecyanine dye C-1 had n=2.45 and k=0.05 at 780 nm (as measured on a dye film of 75 nm thick by the same procedure as described previously) and the absorption spectrum of its thin film had a λmax of 702 nm and a half-value width (as measured on a dye film of 80 nm thick by the same procedure as described previously) of 185 nm.

Example 7

An optical recording disc was prepared as in Example 1 except that a mixture of dyes A-3 and B-8 in a weight ratio of 3:2 was dissolved in 1-methoxy-2-butanol to form a dye coating solution having a dye content of 2.3% by weight and a dye film was formed as a recording layer by spin coating this solution. The disc was similarly evaluated for characteristics to find satisfactory results at least equivalent to those of Example 1. It is noted that dye B-8 had n=2.45 and k=0.09 at 630 nm (as measured on a dye film of 80 nm thick) and a λmax of 582 nm.

Example 8

An optical recording disc was prepared as in Example 7 except that a mixture of dyes A-3 and B-15 in a weight ratio of 3:1 was dissolved in 1-methoxy-2-butanol to form a dye coating solution having a dye content of 2.2% by weight and a dye film was formed as a recording layer by spin coating this solution. The disc was similarly evaluated for characteristics to find satisfactory results at least equivalent to those of Example 7. It is noted that dye B-15 is improved in solubility and hence in coating properties over dye B-8. It is noted that dye B-15 had n=2.3 and k=0.02 at 630 nm (as measured on a dye film of 80 nm thick) and a λmax of 570 nm.

Example 9

Optical recording discs were prepared as in Examples 7 and 8 except that a recording layer wherein 15% by weight of dye B-8 or B-15 was replaced by quencher Q-1 shown below was formed. The discs were similarly examined for characteristics to find satisfactory results equivalent to those of Examples 7 and 8 and improved light resistance.

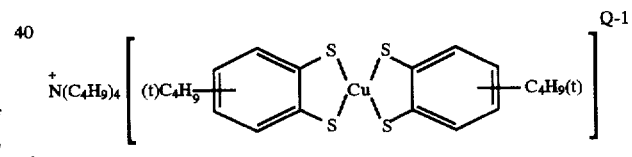

Example 10

An optical recording disc was prepared as in Example 2 except that a mixture of dyes A-3 and B-4 in a weight ratio of 1:1 was dissolved in 1-methoxy-2-butanol to form a dye coating solution having a dye content of 2.5% by weight and a dye film was formed as a recording layer by spin coating this solution. The disc was similarly evaluated for characteristics to find satisfactory results at least equivalent to those of Example 2. It is noted that dye B-4 had n=2.5 and k=0.09 at 650 nm (as measured on a dye film of 80 nm thick) and a λmax of 612 nm.

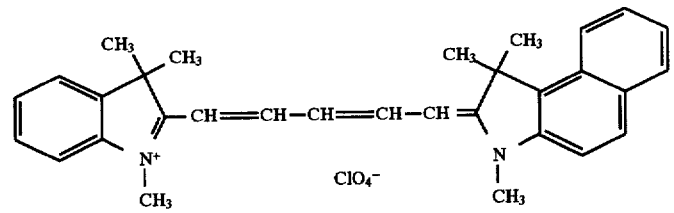

Dye C-1

Example 11

An optical recording disc was prepared as in Example 10 except that a dye film was formed as a recording layer using a dye coating solution of a mixture of dyes A-3 and B-5 in a weight ratio of 2:3 in 1-methoxy-2-butanol at a dye content of 2.3% by weight. The disc was similarly evaluated for characteristics to find satisfactory results at least equivalent to those of Example 10. It is noted that dye B-5 is improved in solubility and hence in coating properties over dye B-4. It is noted that dye B-5 had n=2.45 and k=0.09 at 650 nm (as measured on a dye film of 80 nm thick) and a λmax of 611 nm.

Example 12

An optical recording disc was prepared as in Example 10 except that a dye film was formed as a recording layer using a dye coating solution of a mixture of dyes A-3 and B-6 in a weight ratio of 3:2 in 1-methoxy-2-butanol at a dye content of 3% by weight. The disc was similarly evaluated for characteristics to find satisfactory results at least equivalent to those of Example 10. It is noted that dye B-6 is improved in solubility and hence in coating properties over dye B-4. It is noted that dye B-6 had n=2.45 and k=0.08 at 650 nm (as measured on a dye film of 80 nm thick) and a λmax of 614 nm.

Example 13

An optical recording disc was prepared as in Example 10 except that a dye film was formed as a recording layer using a dye coating solution of a mixture of dyes A-3 and B-7 in a weight ratio of 1:1 in 1-methoxy-2-butanol at a dye content of 2.3% by weight. The disc was similarly evaluated for characteristics to find satisfactory results at least equivalent to those of Example 10. It is noted that dye B-7 is improved in solubility and hence in coating properties over dye B-4. It is noted that dye B-7 had n=2.40 and k=0.09 at 650 nm (as measured on a dye film of 80 nm thick) and a λmax of 612 nm.

Example 14

Optical recording discs were prepared as in Examples 10 to 13 except that a dye film wherein 30% by weight of dye B4, B-5, B-6 or B-7 was replaced by quencher Q-1 used in Example 9 was formed as a recording layer. The discs were similarly examined for characteristics to find satisfactory results equivalent to those of the corresponding Examples and improved light resistance.

Example 15

Metal-containing azo compound No. I-1, cyanine dye B-5, and phthalocyanine dye A-3 were used as a dye for the optical recording layer. The dyes were mixed in a weight ratio of compound No. I-1:cyanine dye B-5:phthalocyanine dye A-3=2:1:2. Using the dye mix, a dye-containing recording layer was formed to a thickness of 2,000 Å (200 nm) by spin coating on a polycarbonate resin substrate of 120 mm in diameter and 1.2 mm in thickness which was pre-grooved (depth 0.14 μm, width 0.50 μm, groove pitch 1.6 μm). The coating solution used herein was a 2.25 wt % solution in a solvent mixture of 2-ethoxyethanol (ethyl cellosolve) and 1-methoxy-2-butanol in a weight ratio of 1:1. Next, an Au reflective layer of 850 Å thick was formed on the recording layer by sputtering, and a transparent protective layer (5 μm thick) of a UV-curing type acrylic resin was formed thereon, completing an optical recording disc (see FIG. 2).

Compound No. I-1 had a λmax of 610 nm as measured on a thin film sample of 50 nm thick and n=2.10 and k=0.040 at 650 nm as determined by the aforementioned procedure.

Dye A-3 had a λmax of 725 nm and a half-value width of 125 nm as measured on a thin film sample of 80 nm thick and n=2.4 and k=0.10.

Cyanine dye B-5 had a λmax of 611 nm as measured on a thin film sample of 80 nm thick and n=2.45 and k=0.09 at 650 nm as determined by the aforementioned procedure.

The thus prepared optical recording disc, disc sample No. 15, was recorded at a linear velocity of 1.2 m/s using a laser having an oscillation wavelength of 780 nm and read using the laser having an oscillation wavelength of 780 nm and a laser having an oscillation wavelength of 650 nm. The optimum recording power (PO), degree of modulation or simply modulation (I11Mod), and reflectance (Rtop) were measured.

The disc was irradiated with a xenon lamp (Xenon Fadeometer manufactured by Shimazu Mfg. K.K.) at 80,000 lux for 200 hours. Changes of modulation (I11Mod) and reflectance (Rtop) after exposure were determined.

The results are shown below.

|  | Initial | After exposure |
|---|---|---|
| Evaluation using a laser with oscillation wavelength 780 nm | | |
| Rtop | 75% | 75% |
| I11Mod | 66% | 66% |
| PO | 6.8 mW | |
| Evaluation using a laser with oscillation wavelength 650 nm | | |
| Rtop | 33% | 33% |
| I11Mod | 63% | 63% |

Disc sample No. 15 had fully satisfactory characteristics as CD-RII and excellent light stability. It was also found that the use of a metal-containing azo compound within the scope of the invention improves light deterioration of a cyanine dye. The metal-containing azo compound exhibited a greater degree of improvement than the bisphenyldithiol metal complex quencher Q-1 in the foregoing example.

Example 16

A disc sample No. 16 was formed as in Example 15 except that metal-containing azo compound No. I-28, cyanine dye B-5, and phthalocyanine dye A-3 were used as a dye for the optical recording layer and the dyes were mixed in a weight ratio of compound No. I-28:cyanine dye B-5:phthalocyanine dye A-3=1:1:2. The disc sample was recorded at a linear velocity of 1.2 m/s using a laser having an oscillation wavelength of 780 nm and read using the laser having an oscillation wavelength of 780 nm and a laser having an oscillation wavelength of 650 nm. The optimum recording power (PO), modulation (I11Mod), and reflectance (Rtop) were measured.

The disc was irradiated with a xenon lamp (Xenon Fadeometer manufactured by Shimazu Mfg. K.K.) at 80,000 lux for 200 hours. Changes of modulation (I11Mod) and reflectance (Rtop) after exposure were determined.

The results are shown below.

|  | Initial | After exposure |
| --- | --- | --- |
| Evaluation using a laser with oscillation wavelength 780 nm | | |
| Rtop | 74% | 74% |
| I11Mod | 65% | 65% |
| P0 | 7.2 mW | |
| Evaluation using a laser with oscillation wavelength 650 nm | | |
| Rtop | 31% | 31% |
| I11Mod | 63% | 63% |

It is noted that compound No. I-28 had a $\lambda$max of 600 nm as measured on a thin film sample of 50 nm thick and n=2.10 and k=0.05 at 650 nm as determined by the aforementioned procedure.

Disc sample No. 16 had fully satisfactory characteristics as CD-RII and excellent light stability. It was also found that the use of a metal-containing azo compound within the scope of the invention significantly improves light deterioration of a cyanine dye as in Example 15.

Example 17

An optical recording disc sample No. 17 was formed as in Example 15 except that metal-containing azo compound No. I-1, cyanine dye B-5, and phthalocyanine dye A-3 were used as a dye for the optical recording layer, the dyes were mixed in a weight ratio of compound No. I-1:cyanine dye B-5:phthalocyanine dye A-3=2:1:6, and a 2.25 wt % solution of the dye mix in a solvent mixture of 2-ethoxyethanol and 1-methoxy-2-butanol in a weight ratio of 1:1 was used. The disc sample was similarly evaluated for characteristics, obtaining satisfactory results equivalent to Example 15.

Example 18

An optical recording disc sample No. 18 was formed as in Example 15 except that metal-containing azo compound No. I-1, cyanine dye B-11, and phthalocyanine dye A-3 were used as a dye for the optical recording layer, and the dyes were mixed in a weight ratio of compound No. I-1:cyanine dye B-11:phthalocyanine dye A-3=2:1:2. The disc sample was similarly evaluated for characteristics, obtaining satisfactory results equivalent to Example 15. It is noted that cyanine dye B-11 had a $\mu$max of 613 nm as measured on a thin film sample of 80 nm thick and n=2.40 and k=0.11 at 650 nm as determined by the aforementioned procedure.

Also cyanine dye B-11, which is a compound having an alkoxyalkyl radical, had better solubility and better coating properties than cyanine dye B-5.

Example 19

An optical recording disc sample No. 19 was formed as in Example 17 except that metal-containing azo compound No. I-1, cyanine dye B-9, and phthalocyanine dye A-3 were used as a dye for the optical recording layer, and the dyes were mixed in a weight ratio of compound No. I-1:cyanine dye B-9:phthalocyanine dye A-3=2:1:2. The disc sample was similarly evaluated for characteristics, obtaining satisfactory results equivalent to Example 15. It is noted that cyanine dye B-9 had a $\lambda$max of 613 nm as measured on a thin film sample of 80 nm thick and n=2.40 and k=0.12 at 650 nm as determined by the aforementioned procedure.

Also cyanine dye B-9, which is a compound having an alkoxyalkyl radical, had better solubility and better coating properties than cyanine dye B-5.

Example 20

An optical recording disc sample No. 20 was formed as in Example 17 except that metal-containing azo compound No. I-1, cyanine dye B-2, and phthalocyanine dye A-3 were used as a dye for the optical recording layer, and the dyes were mixed in a weight ratio of compound No. I-1:cyanine dye B2:phthalocyanine dye A-3=2:1:2. The disc sample was evaluated for characteristics as in Example 15, obtaining satisfactory results equivalent to Example 15.

It is noted that cyanine dye B-2 had a $\lambda$max of 610 nm as measured on a thin film sample of 80 nm thick and n=2.5 and k=0.08 at 650 nm as determined by the aforementioned procedure.

Example 21

An optical recording disc sample No. 21 was formed as in Example 15 except that metal-containing azo compound No. I-29, cyanine dye B-5, and phthalocyanine dyes A-3 and A-28 were used as a dye for the optical recording layer, the dyes were mixed in a weight ratio of compound No. I-29:cyanine dye B-5:phthalocyanine dye A-3:phthalocyanine dye A-28=2:1:1:1, and a 2.25 wt % solution of the dye mix in 2-ethoxyethanol was used. The disc sample was similarly evaluated for characteristics, obtaining satisfactory results equivalent to Example 15.

It is noted that compound No. I-29 had a $\lambda$max of 615 nm as measured on a thin film sample of 50 nm thick and n=2.05 and k=0.040 at 650 nm as determined by the aforementioned procedure. Dye A-28 had a $\lambda$max of 725 nm, a half-value width of 130 nm, n=2.4 and k=0.09 as measured on a thin film sample of 80 nm thick.

We claim:

1. An optical recording medium comprising a recording layer and a reflecting layer on a substrate, wherein said recording layer comprises a dye A having a complex index of refraction at 780 nm whose real part n is 1.8 to 2.8 and imaginary part k is up to 0.15 and forming a thin film having an absorption spectrum whose half-value width is up to 170 nm and a dye B having a complex index of refraction at 630 nm or 650 nm whose real part n is 1.8 to 2.8 and imaginary part k is up to 0.2.

2. The optical recording medium of claim 1 wherein said dye A is a phthalocyanine dye of the following formula (I):

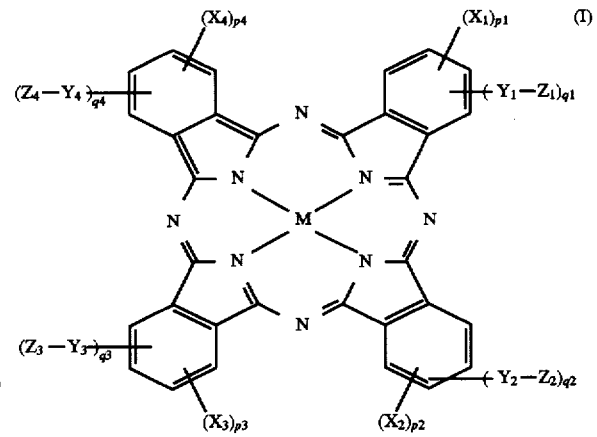

wherein M is a center atom, each of $X_1$, $X_2$, $X_3$, and $X_4$ which may be the same or different is a halogen atom, p1, p2, p3, and p4 each are 0 or an integer of 1 to 4, the sum of p1+p2+p3+p4 is 0 to 15, each of $Y_1$, $Y_2$, $Y_3$, and $Y_4$ which may be the same or different is an oxygen or sulfur atom, each of $Z_1$, $Z_2$, $Z_3$, and $Z_4$ which may be the same or different is selected from the group consisting of an alkyl radical, alicyclic hydrocarbon radical, aromatic hydrocarbon radical, and heterocyclic radical each having at least 4 carbon atoms, and q1, q2, q3, and q4 each are 0 or an integer of 1 to 4 and are not equal to 0 at the same time, the sum of q1+q2+q3+q4 is 1 to 8.

3. The optical recording medium of claim 2 wherein the position at which each of $Y_1$, $Y_2$, $Y_3$, and $Y_4$ is attached to the phthalocyanine ring is the 3- and/or 6-position.

4. The optical recording medium of claim 2 wherein each of $Z_1$, $Z_2$, $Z_3$, and $Z_4$ is an alicyclic hydrocarbon radical or aromatic hydrocarbon radical.

5. The optical recording medium of claim 4 wherein the alicyclic hydrocarbon radical or aromatic hydrocarbon radical represented by each of $Z_1$, $Z_2$, $Z_3$, and $Z_4$ has a substituent at a position adjacent to its position of attachment to a corresponding one of $Y_1$, $Y_2$, $Y_3$, and $Y_4$.

6. The optical recording medium of claim 1 wherein said dye B is a trimethinecyanine dye of the following formula (II):

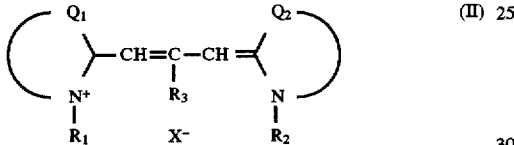

wherein each of $Q_1$ and $Q_2$ is a group of atoms necessary to complete a heterocyclic ring with the carbon and nitrogen atoms, the heterocyclic skeletons completed by $Q_1$ and $Q_2$ may be the same or different, each of $R_1$ and $R_2$ which may be the same or different is an aliphatic hydrocarbon radical, $R_3$ is a hydrogen atom or monovalent substituent, and $X^-$ is a monovalent anion.

7. The optical recording medium of claim 6 wherein said dye B is a trimethineindolenine cyanine dye of the following formula (III):

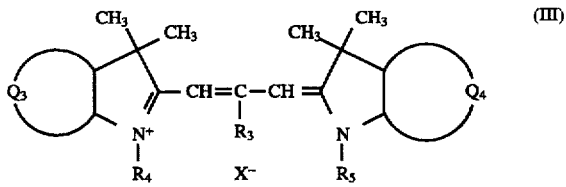

wherein each of $Q_3$ and $Q_4$ is a group of atoms necessary to complete an indolenine or benzoindolenine ring with the pyrrole ring, the rings completed by $Q_3$ and $Q_4$ may be the same or different, $R_3$ is a hydrogen atom or monovalent substituent, each of $R_4$ and $R_5$ is an alkyl radical, and $X^-$ is a monovalent anion.

8. The optical recording medium of claim 7 wherein either one of the rings completed by $Q_3$ and $Q_4$ together with the pyrrole rings is an indolenine ring and the other is a benzoindolenine ring, and the benzene ring of the benzoindolenine ring is fused to the indolenine ring at the 4 and 5-positions thereof.

9. The optical recording medium of claim 8 wherein the indolenine ring has a hydrogen atom, halogen atom or alkyl radical at the 5-position thereof.

10. The optical recording medium of claim 7 wherein both the rings completed by $Q_3$ and $Q_4$ together with the pyrrole rings are benzoindolenine rings, and the benzene ring of each benzoindolenine ring is fused to the indolenine ring at the 4 and 5-positions thereof.

11. The optical recording medium of claim 7 wherein $R_4$ and/or $R_5$ is an alkoxyalkyl radical.

12. The optical recording medium of claim 6 wherein a singlet oxygen quencher is used as a stabilizer along with said trimethinecyanine dye.

13. The optical recording medium of claim 12 wherein said singlet oxygen quencher is a metal-containing azo compound of the following formula (IV):

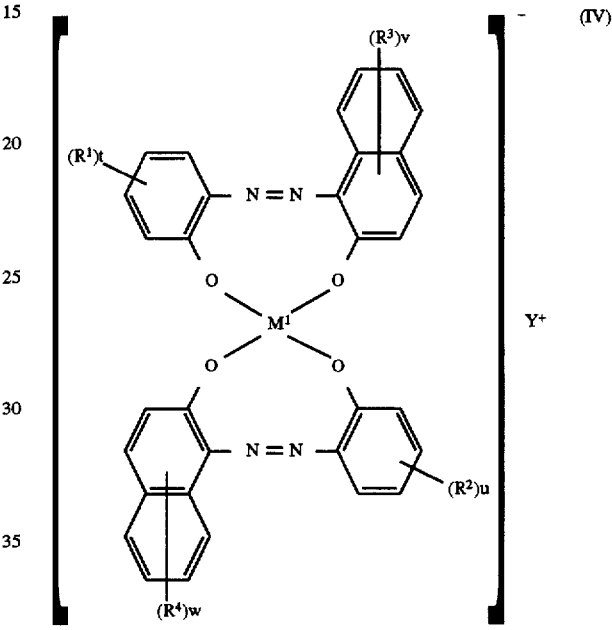

wherein each of $R^1$ and $R^2$ is selected from the group consisting of a nitro radical, halogen atom, amino radical, sulfamoyl radical, alkyl radical, and alkoxy radical, t and u each are 0 or an integer of 1 to 4, each of $R^3$ and $R^4$ is selected from the group consisting of a halogen atom, nitro radical, alkyl radical, alkoxy radical, and amino radical, v and w each are 0 or an integer of 1 to 6, $M^1$ is cobalt or nickel, and $Y^+$ is an alkyl-substituted ammonium ion, with the proviso that t, u, v and w are not equal to 0 at the same time, and the sum of t+u+v+w is 1 to 20.

14. The optical recording medium of claim 13 wherein said trimethinecyanine dye and said metal-containing azo compound are mixed and the mixing ratio of said metal-containing azo compound to said trimethinecyanine dye is from 10/90 to 95/5 on a molar basis.

15. The optical recording medium of claim 1 wherein the ratio of dye A to dye B in said recording layer is from 80/20 to 20/80 on a weight basis.

16. The optical recording medium of claim 1 wherein said recording layer has been formed using a coating solution containing dye A and dye B in a solvent which is an alkoxyalcohol.

\* \* \* \* \*